US012602630B1

(12) United States Patent
Khopkar et al.

(10) Patent No.: US 12,602,630 B1
(45) Date of Patent: Apr. 14, 2026

(54) SUPPLY CHAIN NETWORK PRESCRIPTIONS BASED ON ARTIFICIAL INTELLIGENCE TECHNIQUES

(71) Applicant: Coupa Software Incorporated, San Mateo, CA (US)

(72) Inventors: Sushant J. Khopkar, Canton, MI (US); Nicole Ogden, Woodstock, GA (US); Zheng Ouyang, Ann Arbor, MI (US); Aishwarya Sivasurya, Ann Arbor, MI (US); Siddharth Chakravarthy, Birmingham (GB); Prasanna Ragavan, Canton, MI (US); Varshini Ramaraj, Ann Arbor, MI (US); Yun Xu, Ann Arbor, MI (US)

(73) Assignee: Coupa Software Incorporated, Foster City, CA (US)

( * ) Notice: Subject to any disclaimer, the term of this patent is extended or adjusted under 35 U.S.C. 154(b) by 89 days.

(21) Appl. No.: 18/397,029

(22) Filed: Dec. 27, 2023

Related U.S. Application Data

(60) Provisional application No. 63/436,537, filed on Dec. 31, 2022.

(51) Int. Cl.
　　*G06Q 10/0631*　　(2023.01)
　　*G06Q 10/08*　　(2024.01)
(52) U.S. Cl.
　　CPC ......... *G06Q 10/0631* (2013.01); *G06Q 10/08* (2013.01)
(58) Field of Classification Search
　　CPC ................... G06Q 30/0201; G06Q 10/06315
　　See application file for complete search history.

(56) References Cited

U.S. PATENT DOCUMENTS

| | | | | |
|---|---|---|---|---|
| 2003/0078831 A1* | 4/2003 | Kuettner | ............ | G06Q 30/0202 |
| | | | | 705/7.29 |
| 2008/0306785 A1* | 12/2008 | Schuler | ............ | G06Q 10/06375 |
| | | | | 705/7.37 |

(Continued)

FOREIGN PATENT DOCUMENTS

| | | |
|---|---|---|
| CN | 107067218 A | 8/2017 |
| JP | 2021060644 A | 4/2021 |

OTHER PUBLICATIONS

Biswas, Sanjib and Sen, Jaydip. A Proposed Architecture for Big Data Driven Supply Chain Analytics. ICFAI University Press (IUP) Journal of Supply Chain Management, vol. XIII, No. 3 (2016), pp. 7-34 (Year: 2016).*

(Continued)

*Primary Examiner* — Johnna R Loftis
(74) *Attorney, Agent, or Firm* — Baker Botts L.L.P.

(57) ABSTRACT

Embodiments provides a method executed by a server computer executing a supply chain network analysis application of a supply chain model. The method includes receiving supply chain network data associated with a supply chain network having one or more supply chain nodes. The method then programmatically executes inferences on the supply chain network data using one or more machine learning models and one or more heuristic algorithms to implement descriptive analytics, diagnostic analytics, and prescriptive analytics to create and store one or more scenario prescriptions that specify one or more changes to the one or more supply chain nodes. The method performs steps for programmatically executing inferences on the supply chain network data that includes extracting one or more data features at a path level, the one or more data features indicating descriptive insights related to one or more paths in the supply chain network. The method includes a step of identifying, using one or more path-level machine learning (Continued)

models, one or more cost drivers of the one or more paths in the supply chain network by computing a feature score of each of the one or more data features at the path level. The method includes creating and storing, using the one or more path-level machine learning models and the feature score of each of the one or more data features, one or more digital representations of the one or more scenario prescriptions. The method includes generating and displaying one or more visualizations of one or more updated network models that implements the one or more scenario prescriptions.

16 Claims, 20 Drawing Sheets

(56) References Cited

U.S. PATENT DOCUMENTS

| | | | | |
|---|---|---|---|---|
| 2010/0125486 A1* | 5/2010 | Sinclair | .............. | G06Q 30/0202 705/7.31 |
| 2014/0278706 A1* | 9/2014 | Leidner | ............ | G06Q 10/06315 705/7.25 |
| 2021/0117896 A1* | 4/2021 | Koc | ................. | G06Q 10/06393 |
| 2021/0398050 A1* | 12/2021 | Dunbar | ............ | G06Q 10/06375 |
| 2022/0027826 A1* | 1/2022 | Makhija | ................. | G06N 3/045 |
| 2022/0270043 A1* | 8/2022 | Le | .................... | G06Q 10/08345 |
| 2022/0319312 A1 | 10/2022 | Mintz | | |
| 2025/0131354 A1* | 4/2025 | Manchenahally | ... | G06Q 10/087 |
| 2025/0148398 A1* | 5/2025 | Evans | ................. | G06Q 30/016 |

OTHER PUBLICATIONS

Osho, Grace Omotunde, Julius Olatunde Omisola, and Joseph Oluwasegun Shiyanbola. "An Integrated AI-Power BI Model for Real-Time Supply Chain Visibility and Forecasting: A Data-Intelligence Approach to Operational Excellence." Unknown Journal (2020). (Year: 2020).*

* cited by examiner

*FIG. 1A*

Node skipping scenarios:

| | AI Prescriptions | | Model |
|---|---|---|---|
| Cost-saving | 0.7M | | 0.3M |

534     536

Volume consolidation scenario for P1,P3, P4:
Potential cost saving = 0.4M

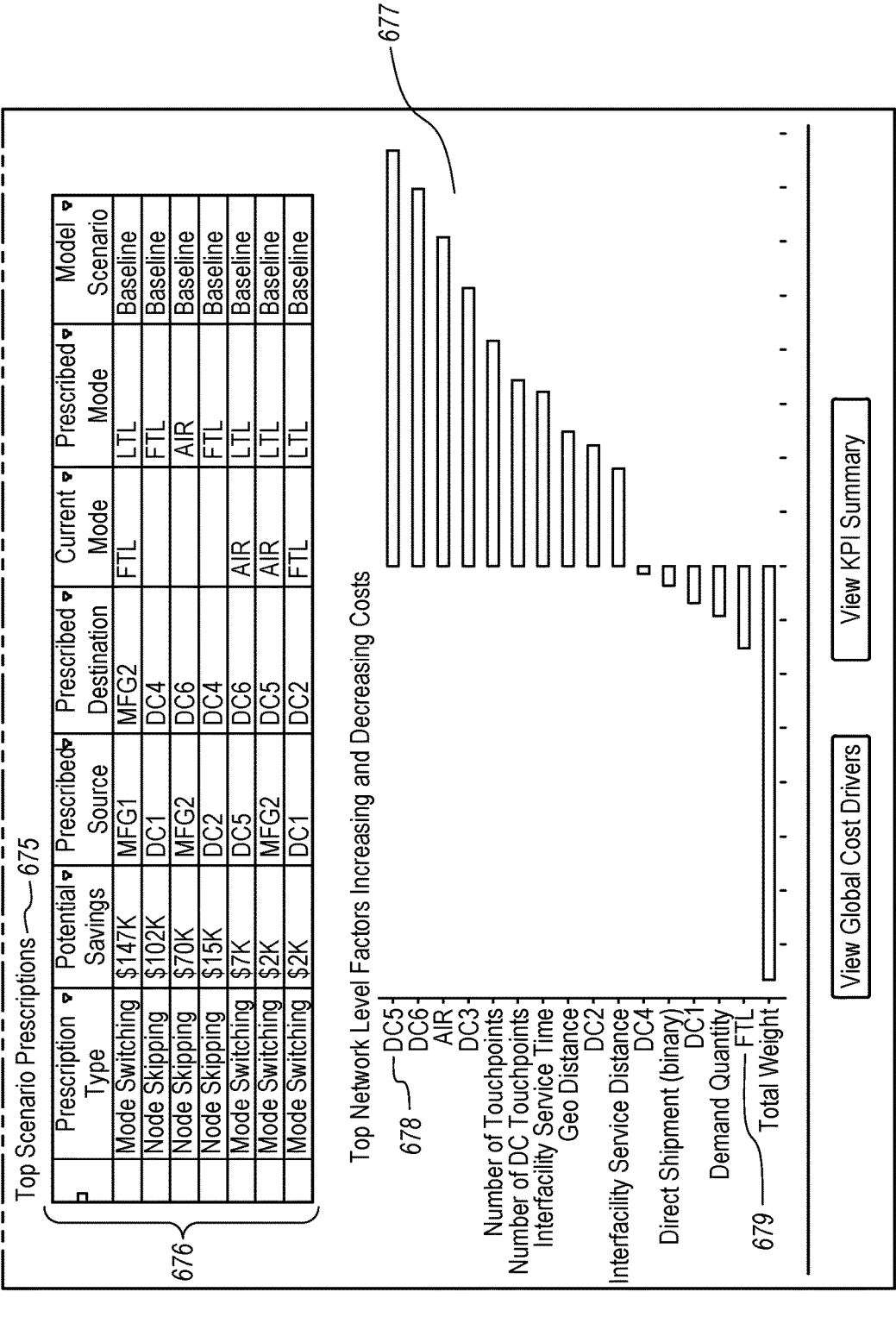

Top Scenario Prescriptions — 675

| | Prescription Type | Potential Savings | Prescribed Source | Prescribed Destination | Current Mode | Prescribed Mode | Model Scenario |
|---|---|---|---|---|---|---|---|
| | Mode Switching | $147K | MFG1 | MFG2 | FTL | LTL | Baseline |
| | Node Skipping | $102K | DC1 | DC4 | | FTL | Baseline |
| | Node Skipping | $70K | MFG2 | DC6 | | AIR | Baseline |
| | Node Skipping | $15K | DC2 | DC4 | | FTL | Baseline |
| | Mode Switching | $7K | DC5 | DC6 | AIR | LTL | Baseline |
| | Mode Switching | $2K | MFG2 | DC5 | AIR | LTL | Baseline |
| | Mode Switching | $2K | DC1 | DC2 | FTL | LTL | Baseline |

Top Network Level Factors Increasing and Decreasing Costs

- DC5
- DC6
- AIR
- DC3
- Number of Touchpoints
- Number of DC Touchpoints
- Interfacility Service Time
- Geo Distance
- DC2
- Interfacility Service Distance
- DC4
- Direct Shipment (binary)
- DC1
- Demand Quantity
- FTL
- Total Weight View Global Cost Drivers          View KPI Summary

Figure 8:
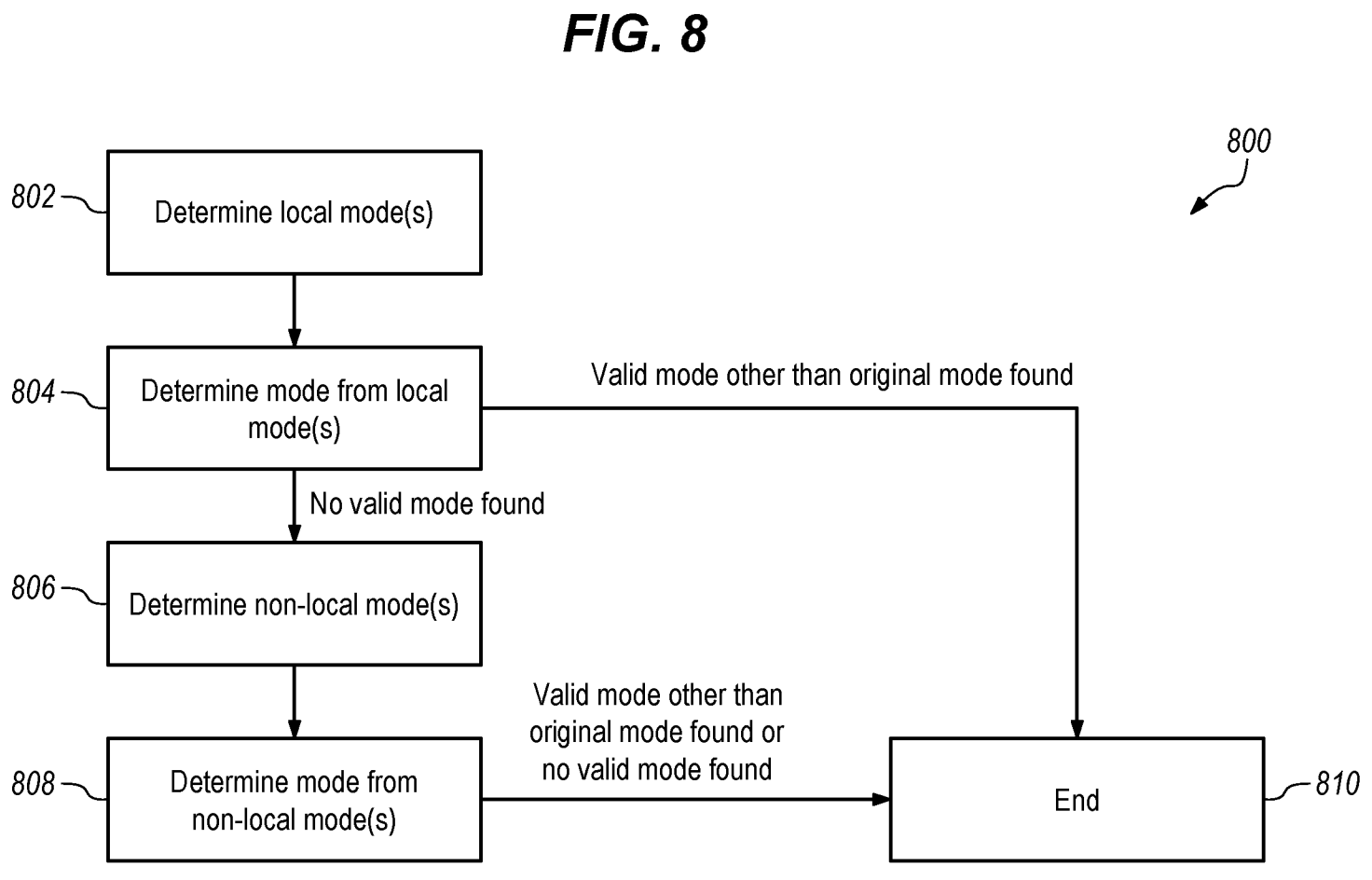

| 802 | Determine local mode(s) |
|---|---|

| 804 | Determine mode from local mode(s) |
|---|---|

No valid mode found

| 806 | Determine non-local mode(s) |
|---|---|

| 808 | Determine mode from non-local mode(s) |
|---|---|

Valid mode other than original mode found

Valid mode other than original mode found or no valid mode found

| 810 | End |
|---|---|

Figure 9:
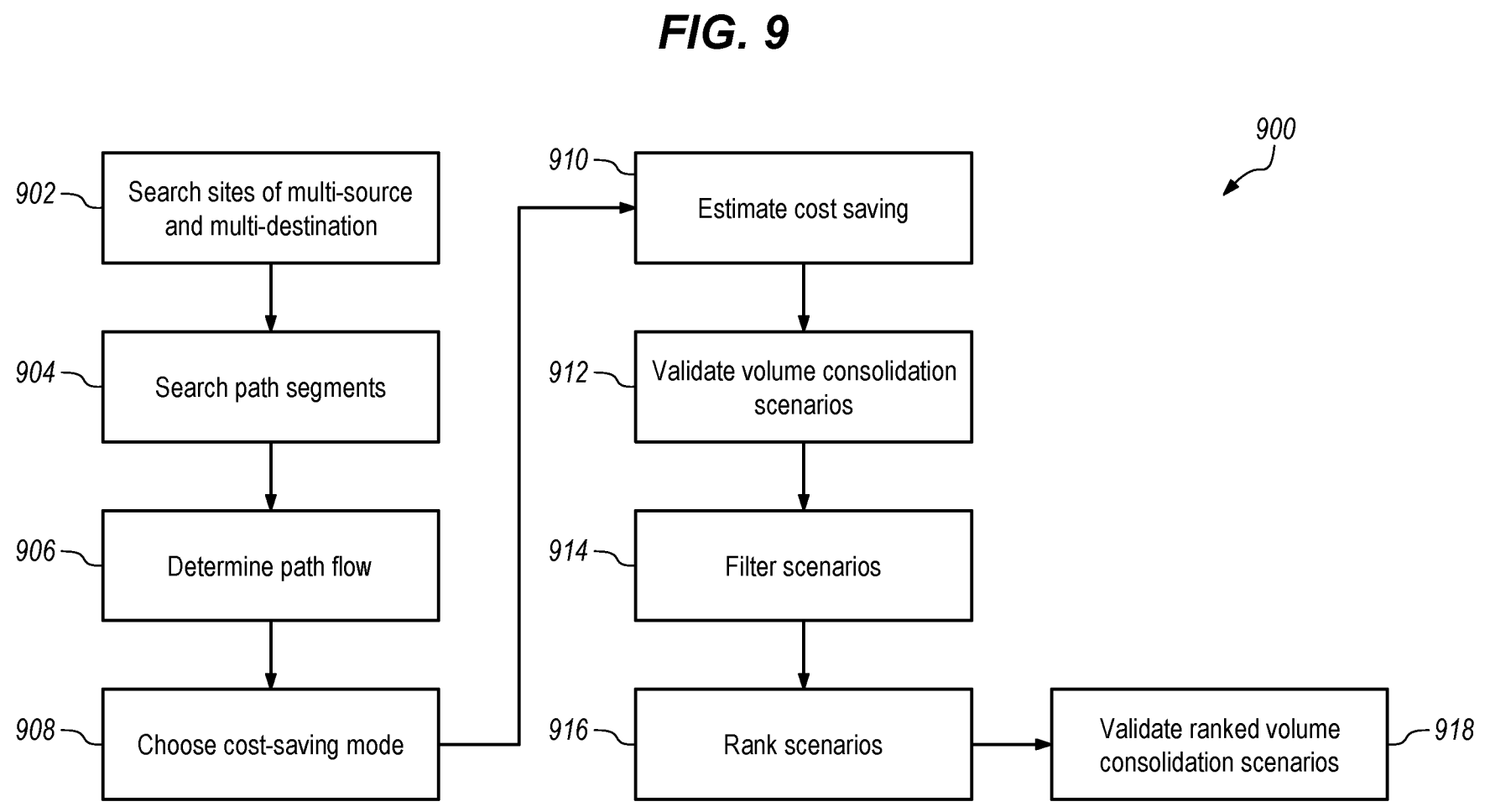

902 — Search sites of multi-source and multi-destination

904 — Search path segments

906 — Determine path flow

908 — Choose cost-saving mode

910 — Estimate cost saving

912 — Validate volume consolidation scenarios

914 — Filter scenarios

916 — Rank scenarios

918 — Validate ranked volume consolidation scenarios

SUPPLY CHAIN NETWORK PRESCRIPTIONS BASED ON ARTIFICIAL INTELLIGENCE TECHNIQUES

BENEFIT CLAIM

This application claims the benefit under 35 U.S.C. § 119(e) of provisional patent application 63/436,537, filed Dec. 31, 2022, the entire contents of which are hereby incorporated by reference as if fully set forth herein. Applicant hereby rescinds any disclaimer of claim scope in the application(s) of which the benefit is claimed and advises the USPTO that the present claims may be broader than any application(s) of which the benefit is claimed.

COPYRIGHT NOTICE

TECHNICAL FIELD

One technical field of the present disclosure is related to applied artificial intelligence and machine learning, including classifiers. Another technical field is computer-implemented decision support systems applied to international supply chain network analysis. Yet another technical field is graph optimization.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A supply chain comprises a set of physical facilities and means of transportation that are used to transform raw materials or commodities into finished goods and place those goods in the possession of a consumer. Computer-implemented methods of analyzing supply chains, based upon graph analysis and network analysis algorithms, have entered wide use, and have become critical to driving decisions concerning the movement of commodities, partly finished goods, and completed products. Contemporary supply chain analysis commonly focuses on sites or nodes, such as manufacturers, distribution centers, and customers, as well as lanes and paths between them. A lane can be a single route between a first node and a second node, whereas a path comprises a plurality of lanes and typically represents an end-to-end movement of commodities or goods from the point of manufacture to the point of consumption.

Supply chain design and planning (SCDP) primarily involves solving network optimization problems using software-implemented algorithms that seek to optimize paths in a network of nodes and lanes. One objective of network optimization is to minimize the cost of the movement of commodities or goods through the network, as well as costs at nodes, and to maximize the profit or return to an entity that owns, operates, manages, or controls the network. Another objective is to reduce the consumption of computing resources, such as network messages and network bandwidth, CPU processing cycles, memory consumption, and data storage. In some scenarios, the consumption of these computing resources is higher in inefficient supply chain networks, and less when a network has been optimized by machine solution of network optimization problems. For example, in an inefficient network, an entity may send far more email messages, API calls, text messages, or other electronic communications to nodes to obtain status, inventory levels, information about the movement of commodities or goods, or to provide instructions concerning any of the foregoing. Excess communications of these kinds may generate unnecessary network traffic and can require supporting data centers to have more CPUs or virtual machine instances, more main memory, and/or more non-volatile digital data storage. Consequently, an entity that owns, operates, manages, or controls a complex supply chain network has an ongoing need to optimize the network to reduce the complexity and cost of information technology systems and the resources used by the entity.

Computer solutions for network optimization problems usually create a baseline model that represents, digitally in main memory and in terms of a graph or network data structure, a current state of nodes, lanes, and paths in a supply chain. Network analysis software can be programmed to generate visual representations of the baseline model and display the generated visual representations of the baseline model. Input from end users, termed modelers, can be received to add a facility or node, remove a node, define new modes of transportation, add, or remove lanes, or change paths.

SUMMARY

The appended claims may serve as a summary of the disclosure.

BRIEF DESCRIPTION OF THE DRAWINGS

In the drawings:

Figure 1A:
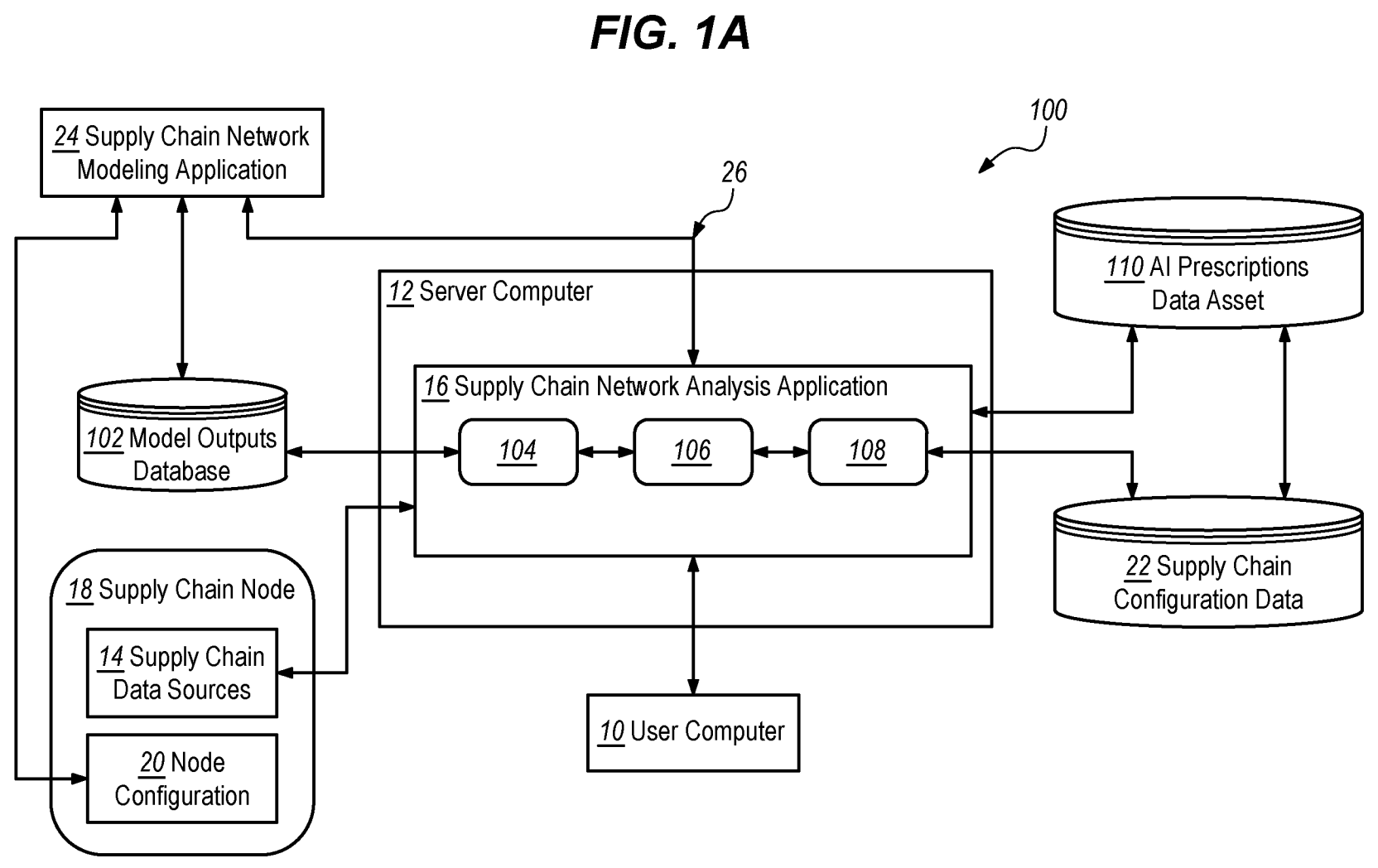

FIG. 1A illustrates a distributed computer system showing the context of use and principal functional elements with which one embodiment could be implemented.

Each of FIG. 5A, FIG. 5B, FIG. 5C.

Each of FIG. 6A, FIG. 6B.

FIG. 8 illustrates an example process of a local mode search according to some embodiments.

FIG. 9 illustrates an example process for volume consolidation according to some embodiments.

DETAILED DESCRIPTION

Figure 1B:
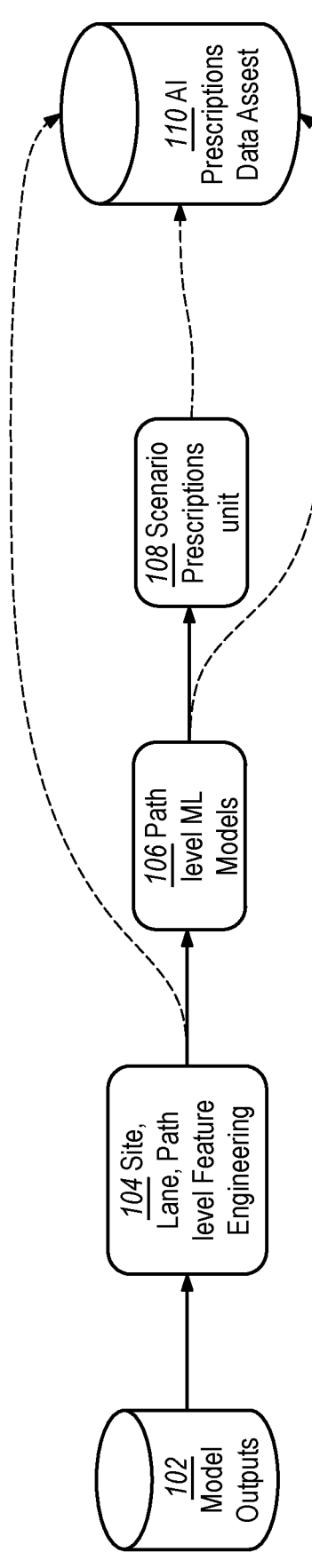
FIG. 1B illustrates functional elements of a computer system that is programmed to generate artificial intelligence-based prescriptions for modifications to a supply chain network, in one embodiment.

In the following description, for the purposes of explanation, numerous specific details are set forth in order to provide a thorough understanding of the present disclosure. It will be apparent, however, that embodiments of the present disclosure may be practiced without these specific details. In other instances, well-known structures and devices are shown in block diagram form in order to avoid unnecessarily obscuring the described embodiments of the present disclosure.

The text of this disclosure, in combination with the drawing figures, is intended to state in prose the algorithms that are necessary to program the computer to implement the claimed embodiments, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the embodiments claimed herein.

An embodiment can be used in a distributed computer system comprising components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. Other arrangements may include fewer or different components, and the division of work between the components may vary depending on the arrangement.

The drawing figures and all of the descriptions and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

Each flow diagram or written description of an algorithm herein is intended as an illustration at the functional level at which skilled persons, in the art to which this disclosure pertains, communicate with one another to describe, and implement algorithms using programming. The flow diagrams are not intended to illustrate every instruction, method object, or sub-step that would be needed to program every aspect of a working program, but are provided at the same functional level of illustration that is normally used at the high level of skill in this art to communicate the basis of developing working programs.

1. General Overview

A supply chain network analysis application is programmed to execute inferences on supply chain data to create and store one or more scenarios or prescriptions that specify changes to implement in supply chain nodes. For example, embodiments may provide the generation of prescriptions using one or more heuristic algorithms and/or one or more machine learning models. For example, embodiments may provide a supply chain prescriptions application to analyze a supply chain's data. Based on the supply chain data, descriptive, diagnostic, and prescriptive insights are collected. In particular, the application is programmed to use prescriptive analytics, descriptive analytics, and diagnostic analytics for algorithmically prescribing scenarios to add to a model to reduce various costs in a network, for example, by prescribing changes in configuration data that change modes, paths, or lanes. Algorithms for descriptive analytics provide descriptive insights at path, lane, and site levels to provide a better understanding of what is happening in the overall network. The supply chain data can be made available through a supply chain model. Algorithms for diagnostic analytics, which may use machine learning models, provide cost drivers at the path level for users to understand what is driving various costs in their supply chain network. A prescriptive analytics workflow may be programmed using machine learning models and/or heuristic algorithms or models. With a complex network, human analysis of optimal paths, the addition of sites, and the use of direct shipment is impossible as the number of permutations, metadata values, and other variables comprises a quantity of data that exceeds the human mental ability to retain information or consider optimum alternatives. The present disclosure provides an artificial intelligence technique that is implemented to automatically generate prescriptions and thereby enables non-expert users to examine different scenarios in complex networks. This approach reduces the computational load involved in a typical brute-force approach. Embodiments are configured to provide high performance and accuracy and to support node skipping, mode switching, and volume consolidation. In some embodiments, node skipping, mode switching, and volume consolidation are performed to achieve cost and/or risk-reduction workflows for product transportation. For example, supply chain prescriptions may use an algorithmic framework with cost as an objective function to generate transportation-based prescriptions such as node skipping, mode switching, and volume consolidation that proactively identify potential savings in the supply chain of products. In some embodiments, user-defined parameters (for example, invalid modes, shipment frequencies, and mode thresholds as configuration data) may be incorporated to enhance the effectiveness of the supply chain prescriptions application. The input data, output data, and configuration data can be stored in a supply chain database. The cost workflow may be used to help identify potential cost-saving opportunities by either skipping a node, switching a mode, or consolidating shipments. The risk reduction workflow may be used to design robust networks in order to mitigate the effects of potential disruptions in the supply chain networks at critical sites for critical products, In particular, the prescriptive analytics workflow for risk reduction can identify critical products and critical sites by revenue and generate constraints, corresponding to the various levels of risks, that may be imposed on the network to minimize the risk associated with the critical sites. The generated constraints can be consolidated into an optimized scenario to provide a final set of flow of scenarios or prescriptions that change the configuration data of the supply chain network. To eliminate or reduce the infeasibility of scenarios due to the constraints, these constraints on flows may be introduced as soft constraints, where the objective function may be a summation of the Total Cost/Total profit and the penalties that are introduced for any violation of flow constraints in a scenario.

In various embodiments, aspects, and features, the disclosure encompasses the subject matter of the following numbered clauses:

1. A computer-implemented method includes receiving, by a server computer executing a supply chain network analysis application of a supply chain model, supply chain network data associated with a supply chain network having one or more supply chain nodes; programmatically executing inferences on the supply chain network data, by the server computer, using one or more machine learning models and one or more heuristic algorithms to implement descriptive analytics, diagnostic analytics, and prescriptive analytics to create and store one or more scenario prescriptions that specify one or more changes to the one or more supply chain nodes, wherein programmatically executing inferences on the supply chain network data includes extracting one or more data features at a path level, the one or more data features indicating descriptive insights related to one or more paths in the supply chain network; identifying, using one or more path-level machine learning models, one or more cost drivers of the one or more paths in the supply chain network by computing a feature score of each of the one or more data features at the path level; and creating and storing, using the one or more path-level machine learning models and the feature score of each of the one or more data features, one or more digital representations of the one or more scenario prescriptions; and generating and displaying one or more visualizations of one or more updated network models that implements the one or more scenario prescriptions.

2. The computer-implemented method of clause 1, wherein the supply chain network data comprises one or more of supply chain data, supply chain configuration data, or model outputs.

3. The computer-implemented method of clause 1, wherein the supply chain network data comprises supply chain data received from a supply chain data source of the one or more supply chain nodes.

4. The computer-implemented method of clause 1, further includes determining one or more cost-saving functions for the one or more scenario prescriptions, wherein the one or more cost-saving functions comprises node skipping, mode switching, or volume consolidation of shipments.

5. The computer-implemented method of clause 1, wherein the one or more changes to the one or more supply chain nodes comprises one or more of adding or removing a manufacturing (MFG) unit, adding or removing a distribution center (DC) unit, adding or removing a customer location, adding or removing one or more modes of transportation, adding or removing one or more lanes of transportation, consolidating a capacity of one or more products, changing the capacity of the one or more products, or changing a frequency of a shipment.

6. The computer-implemented method of clause 1, further includes extracting one or more data features at a site level or at a lane level, wherein the one or more data features at the site level or the lane level comprise one or more distance-based features, one or more time-based features, one or more binary features, one or more structured-based features, or one or more flow-based features associated with any of the site level.

7. The computer-implemented method of clause 4, wherein the one or more cost-savings functions are calculated based on one or more of a mode distance threshold for a mode selection, a cost threshold on a lane, a geographic distance from a source site to a destination site, or a flow quantity of a product.

8. The computer-implemented method of clause 4, wherein the one or more cost-saving functions comprises the volume consolidation of shipments, which includes identifying a path segment of the one or more paths that is shared by one or more other paths of a same product.

9. A computer system includes one or more processors; and one or more non-transitory computer-readable media coupled to the one or more processors and storing one or more sequences of stored program instructions which when executed using the one or more processors cause the one or more processors to execute: receiving, by a server computer executing a supply chain network analysis application of a supply chain model, supply chain network data associated with a supply chain network having one or more supply chain nodes; programmatically executing inferences on the supply chain network data, by the server computer, using one or more machine learning models and one or more heuristic algorithms to implement descriptive analytics, diagnostic analytics, and prescriptive analytics to create and store one or more scenario prescriptions that specify one or more changes to the one or more supply chain nodes, wherein programmatically executing inferences on the supply chain network data includes extracting one or more data features at a path level, the one or more data features indicating descriptive insights related to one or more paths in the supply chain network; identifying, using one or more path-level machine learning models, one or more cost drivers of the one or more paths in the supply chain network by computing a feature score of each of the one or more data features at the path level; and creating and storing, using the one or more path-level machine learning models and the feature score of each of the one or more data features, one or more digital representations of the one or more scenario prescriptions; and generating and displaying one or more visualizations of one or more updated network models that implements the one or more scenario prescriptions.

10. The computer system of clause 9, wherein the supply chain network data comprises one or more of supply chain data, supply chain configuration data, or model outputs.

11. The computer system of clause 9, wherein the supply chain network data comprises supply chain data received from a supply chain data source of the one or more supply chain nodes.

12. The computer system of clause 9, further comprising sequences of stored program instructions which when executed using the one or more processors cause the one or more processors to execute: determining one or more cost-saving functions for the one or more scenario prescriptions, wherein the one or more cost-saving functions comprises node skipping, mode switching, or volume consolidation of shipments.

13. The computer system of clause 9, the one or more changes to the one or more supply chain nodes comprises one or more of adding or removing a manufacturing (MFG) unit, adding or removing a distribution center (DC) unit, adding or removing a customer location, adding or removing one or more modes of transportation, adding or removing one or more lanes of transportation, consolidating a capacity of one or more products, changing the capacity of the one or more products, or changing a frequency of a shipment.

14. The computer system of clause 9, further includes sequences of stored program instructions which when executed using the one or more processors cause the one or more processors to execute: extracting one or more data features at a site level or at a lane level, wherein the one or more data features at the site level or the lane level comprise one or more distance-based features, one or more time-based features, one or more binary features, one or more structured-based features, or one or more flow-based features associated with any of the site level.

15. The computer system of clause 12, wherein the one or more cost-savings functions are calculated based on one or more of a mode distance threshold for a mode selection, a cost threshold on a lane, a geographic distance from a source site to a destination site, or a flow quantity of a product.

16. The computer system of clause 12, wherein the one or more cost-saving functions comprises the volume consolidation of shipments, which includes identifying a path segment of the one or more paths that is shared by one or more other paths of a same product.

17. One or more non-transitory computer-readable storage media, storing instructions which when executed cause one or more processors to execute: receiving, by a server computer executing a supply chain network analysis application of a supply chain model, supply chain network data associated with a supply chain network having one or more supply chain nodes; programmatically executing inferences on the supply chain network data, by the server computer, using one or more machine learning models and one or more heuristic algorithms to implement descriptive analytics, diagnostic analytics, and prescriptive analytics to create and store one or more scenario prescriptions that specify one or more changes to the one or more supply chain nodes, wherein programmatically executing inferences on the supply chain network data includes: extracting one or more data features at a path level, the one or more data features indicating descriptive insights related to one or more paths in the supply chain network; identifying, using one or more path-level machine learning models, one or more cost drivers of the one or more paths in the supply chain network by computing a feature score of each of the one or more data features at the path level; and creating and storing, using the one or more path-level machine learning models and the feature score of each of the one or more data features, one or more digital representations of the one or more scenario prescriptions; and generating and displaying one or more visualizations of one or more updated network models that implements the one or more scenario prescriptions.

18. The one or more non-transitory computer-readable storage media of clause 17, storing instructions which when executed cause the one or more processors to execute: determining one or more cost-saving functions for the one or more scenario prescriptions, wherein the one or more cost-saving functions comprises node skipping, mode switching, or volume consolidation of shipments.

19. The one or more non-transitory computer-readable storage media of clause 17, wherein the one or more changes to the one or more supply chain nodes comprises one or more of adding or removing a manufacturing (MFG) unit, adding or removing a distribution center (DC) unit, adding or removing a customer location, adding or removing one or more modes of transportation, adding or removing one or more lanes of transportation, consolidating a capacity of one or more products, changing the capacity of the one or more products, or changing a frequency of a shipment.

20. The one or more non-transitory computer-readable storage media of clause 17, storing instructions which when executed cause the one or more processors to execute extracting one or more data features at a site level or at a lane level, wherein the one or more data features at the site level or the lane level comprise one or more distance-based features, one or more time-based features, one or more binary features, one or more structured-based features, or one or more flow-based features associated with any of the site level.

2. Structural & Functional Overview 2.1 Example Distributed Computer System

FIG. 1A illustrates a distributed computer system 100 showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1A illustrates only one of many possible arrangements of components configured to execute the programming described herein. Other arrangements may include fewer or different components, and the division of work between the components may vary depending on the arrangement.

FIG. 1A, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In one embodiment, a server computer 12 hosts a supply chain network analysis application 16 and is communicatively coupled to one or more user computers 10, one or more supply chain nodes 18, supply chain configuration data 22, a model output database 102, and artificial intelligence (AI) prescriptions data asset 110. AI prescriptions data asset 110 may be an asset that is classified as a supply chain prescriptions data asset. In an embodiment, the server computer 12 may be a computer system hosting the supply chain network analysis application 16. The one or more user computers 10 may comprise any desktop computers, workstations, laptop computers, tablet computers, or other mobile computing devices such as smartphones. For purposes of illustrating a clear example, FIG. 1A shows one user computer 10, but embodiments of system 100 may be configured with sufficient central processing unit (CPU) power and storage to support thousands to millions of user computers in client-server sessions with the server computer 12. In various embodiments, the server computer 12 may comprise any of one or more rack-mounted servers, server clusters, processor clusters, and/or virtual compute instances and virtual storage instances, on-premises at an enterprise or cloud-based in a virtual computing center of a service provider like AMAZON AWS, GOOGLE CLOUD, MICROSOFT AZURE, etc.

The server computer 12 may be programmed to execute supply chain network analysis application 16, which executes AI/machine learning (ML)-based functions and heuristic algorithms/models, as further described in other sections. The supply chain network analysis application 16 may be programmed to receive a plurality of supply chain network data including, but not limited to, supply chain data, supply chain configuration data 22, and model outputs of other AI/ML models and heuristic algorithms. In an embodiment, the supply chain data may be received from supply chain data sources 14 of one or more supply chain nodes 18. In an embodiment, the supply chain configuration data 22 may be received to assist in locating the one or more supply chain nodes and their data sources. In an embodiment, the model outputs of other AI/ML models may be received from a model output database 102. In an embodiment, the model output database 102 may be programmatically coupled to a feature engineering unit 104, which may be coupled to one or more path-level machine learning models 106. Both the model output database 102 and the machine learning models 106 can provide inputs to a scenario prescriptions unit 108 that may be programmed to analyze the inputs and create and store one or more scenarios or prescriptions in AI prescriptions data asset 110, as further described herein for FIG. 1B. The logic executed by scenarios prescriptions unit 108, which provides the functionality of scenarios prescriptions unit 108 as described herein, may be one or more heuristic algorithms (also referred to as heuristic searching algorithms). As such, the described functionality of scenarios prescriptions unit 108 may be implemented by one or more heuristic algorithms that may include one or more of the process steps and/or provide some or all of the described functionality of scenarios prescriptions unit 108 as described herein. For example, the one or more heuristic algorithms may implement logic for one or more of the described node skipping, mode switching, volume consolidation, selecting lane(s) for prescriptions, and/or estimating costs associated with lanes.

Based on the foregoing inputs, the supply chain network analysis application 16 may be programmed to perform programmatically executing inferences on the plurality of supply chain network data to create and store one or more scenarios or prescriptions. For example, the supply chain network analysis application 16 programmatically executes inferences on the supply chain data to create and store one or more scenarios or prescriptions in AI prescriptions data asset 110 that specify changes to implement in one or more supply chain nodes 18. In one embodiment, supply chain network analysis application 16 may be programmed to execute a computer-implemented process of supply chain network analysis that implements prescriptive analytics, descriptive analytics, and diagnostic analytics. In an embodiment, one or more algorithms for prescriptive analytics may be programmed to assist modelers by algorithmically prescribing scenarios to add to their model in order to reduce various costs in their network, for example, by prescribing changes in configuration data 22 that change modes, paths, or lanes. In an embodiment, algorithms for descriptive analytics provide descriptive insights at path, lane, and site levels to provide a better understanding of what is happening in the overall network. The terms facilities, sites, and nodes may be used interchangeably. In an embodiment, a lane may be a single route between a first node and a second node, and a path may comprise a plurality of lanes and typically represents an end-to-end movement of commodities or goods from the point of manufacture to the point of consumption. For example, if a network has 10,000 lanes, the percentage of lanes using specific modes can be shown. Similarly, path insights like the number of nodes in a path, and the number of distinct modes on a path, can be shown. In an embodiment, algorithms for diagnostic analytics provide cost drivers at the path level for users to understand what is driving various costs in their supply chain network. In some embodiments, a key variable of interest may include transportation cost on any basis from among a plurality of different bases, such as path or lane, per-flow unit, or per mile.

In an embodiment, prescriptive analytics may be programmed using one or more machine learning models. In some examples, knowing what scenarios to create may not be easy. For example, knowing what scenarios to create may be difficult when a supply chain network is large and complex. FIG. 1C shows an example line graph of paths between nodes in an actual supply chain network, derived from real-world experimental data. Graph 30 comprises hundreds of individual lines 32 that connect nodes, for example, from a first node 34 representing a supply depot to a last node 36 representing a customer location. With a network having the quantity of lines 32 and the complexity of paths within the network of FIG. 1C, human analysis of optimal paths, the addition of sites, and the use of direct shipment, can be difficult as the number of permutations, metadata values, and other variables comprises a quantity of data that exceeds the human mental ability to retain information or consider optimum alternatives.

One approach to optimizing a network like that of FIG. 1C is to program a computer-based network analysis system to allow all sites to have lanes or paths to all other sites, then execute a conventional network optimization algorithm; however, this approach may result in the execution time increasing exponentially with network complexity and may become impractical rapidly. Therefore, by providing artificial intelligence-driven prescriptions that may be generated automatically, embodiments of the present disclosure may enable non-expert users to examine different scenarios in complex networks, without the computational load involved in a brute-force approach.

In one embodiment, prescriptive analytics may be programmed to receive AI analysis results as input and to use a heuristic searching algorithm to generate new scenarios for cost-saving. Embodiments may be configured to provide high performance and accuracy in determining and/or predicting any of AI-based one or more scenario prescriptions and AI prescription data assets to determine one or more cost-savings functions that include, but are not limited to, node skipping, mode switching, and volume consolidation, each of which is described further in separate sections herein. Embodiments address numerous technical challenges such as for example, a large search space; the need for transportation mode cost analysis over multiple modes such as land, water, and air; cost estimation and ranking; reality checking; data complexity; and dependencies such as the introduction of new scenarios and constraints, varying relations among scenarios, and relations among costs. Optimized prescriptions that may result from various embodiments of the present disclosure include prescribing the establishment of a new distribution center (DC), which may involve significant up-front costs but may yield long-term network savings. In some embodiments, a prescription may report these costs. In some embodiments, other prescriptions may be determined that may specify different paths or lanes, adding modes of transportation and using the modes on specified lanes or paths, or allowing direct shipment from manufacturer to customer, thus circumventing a DC. In some embodiments, the scenarios and prescriptions result from inferences on supply chain data using AI/ML models rather than requiring the manual creation of scenarios or prescriptions.

The supply chain node 18 broadly represents the computers or any of one or more sources of raw materials, parts fabricators, manufacturers, assemblers, original equipment manufacturers (OEMs), value-added resellers (VARs), warehouses, DC, transportation services or carriers, or other entities in the chain of supply from points of raw material acquisition through the transportation or delivery of finished goods. For purposes of illustrating a clear example, FIG. 1A shows a single supply chain node 18 but embodiments of system 100 can be configured with sufficient CPU power and storage to receive data and analyze data from hundreds to thousands of nodes in hundreds to thousands of complex supply chains. Each supply chain node 18 hosts one or more server computers or data centers comprising at least one supply chain data source 14 and node configuration 20. In an embodiment, a supply chain data source 14 may comprise any of a hypertext transfer protocol (HTTP) server, RESTful API server, relational database, object database, the filesystem of flat files, or another data repository. In some embodiments, supply chain network analysis application 16 may obtain data from a supply chain data source 14 by transmitting programmatic calls, requests, or queries to the supply chain data source 14, which may be programmed to respond programmatically to the calls, requests, or queries, with status data concerning materials, goods, or lines of production, details of orders or projects, and/or weather data. In some embodiments, the supply chain data sources 14 may be programmed to push notifications of the data to a message bus, event bus, or another inter-program communication mechanism that the supply chain network analysis application 16 and the supply chain data sources share.

Node configuration 20 may comprise any digitally stored data at the supply chain node 18 that defines an organization, architecture, management, operation, or production at the node. For example, node configuration 20 may define factory production lines, products associated with production lines or assembly lines, hours of operation, and transportation carriers that the supply chain node 18 may use for the transportation of materials, parts, or goods from the node to other nodes, and the like. In an embodiment, AI prescriptions data asset 110 may be referred to as supply chain prescriptions data asset 110 and may specify changes or updates to the node configuration 20. In some embodiments, the supply chain network analysis application 16 may be programmed to transmit requests for updates to the node configuration 20. In other embodiments, AI prescriptions data asset 110 may specify indirect changes to node configuration 20, such as adding or removing a facility, adding, or removing modes of transportation, adding, or removing lanes of transportation, changes in capacity, and combination thereof. These changes typically require implementation using other systems or personnel rather than directly changing node configuration 20.

Figure 1C:
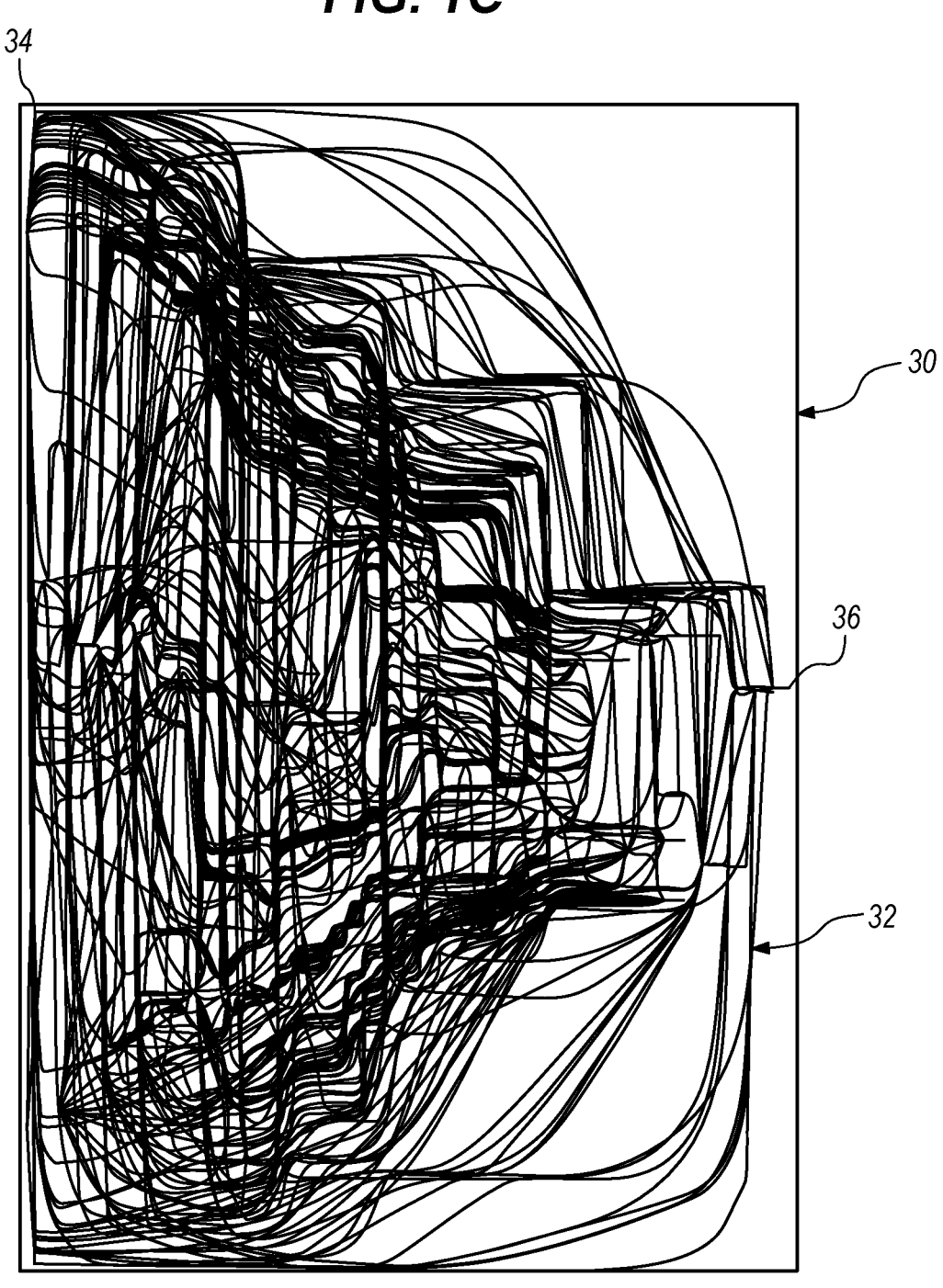
FIG. 1C illustrates an example line graph of paths between nodes in a supply chain network, derived from real-world experimental data, according to an embodiment.

FIG. 1B illustrates examples of functional elements and data flows according to an embodiment. Model output database 102 comprises digital data storage that stores a supply chain generalized model that has been previously generated and processed using a supply chain guru model/cost-to-serve (SCGM/C2S) algorithm. For example, a supply chain network modeling application 24, hosted using server computer 12 or using a different computer, cluster, or virtual compute instance, may generate a generalized model in database 102 and may implement the C2S algorithm. A commercial example of supply chain network modeling application 24 is COUPA SUPPLY CHAIN MODELER, commercially available from Coupa Software Incorporated, San Mateo, California. In an embodiment, the C2S algorithm may be programmed to enumerate and assign costs to all paths in a completed, optimized model, and to create and store other data features in association with each of the paths. Thus, FIG. 1B assumes that a user has executed a program to generate and store a baseline model and that the system of FIG. 1B may digitally access the baseline model and the input data used to generate the baseline model. Database 102 may be programmed as a set of relational tables in which rows represent lanes, columns represent data features or attributes of lanes, and sets of one or more rows represent paths.

In some embodiments, feature engineering unit 104, path-level ML models 106, and scenario prescriptions unit 108 of FIG. 1B may represent methods, classes, functions, or other sets of program instructions of the supply chain network analysis application 16 (FIG. 1A). In an embodiment, the feature engineering unit 104 comprises one or more sequences of stored program instructions that are programmed to read files from the database 102, to select and order data features at a site level, lane level, or path level, and digitally create and store output tables with selected data features in database 102, AI prescriptions data asset 110, or other digital data storage. The data features in tables of the database 102 may include metadata values, such as the number of nodes, service distance, service time, node binaries, mode binaries, etc. The data features may be static and unchanged based on the user or customer, or dynamic, meaning that features may include different values for different customers. An example of a static feature is the number of touchpoints of a path and the total flow quantity of a path. Examples of dynamic features include binaries for countries, sites, and nodes. A country binary specifies, using a Boolean value, whether a lane or path traverses a particular country, based on conducting a lookup in a sites table that specifies the country location of a site along a lane or path. Based on the particular configuration of multiple supply chain networks of multiple users or customers, the country binaries of the networks may change across different customers. Further, different customers may use different sets of modes across a network. Therefore, feature data may specify Boolean values that signify whether a lane or path uses a particular mode on that lane or path. The set of Boolean values per customer may vary across customers, networks, paths, and lanes. In some embodiments, feature data may specify aggregated features such as a service distance associated with one or more modes in a path or a number of unique countries a path is passing through. Aggregated features, in combination with one or more other features of feature data, may help in predicting and estimating one or more cost drivers of a network with improved accuracy.

For example, one or more of the following output tables may be generated for Scenario Prescriptions: scgm_pre-scriptions_details, scgm_prescriptions_summary, scgm_path_sets, scgm_product_sets, and/or scgm_lane_sets. The last three are tables which define sets, the IDs for which appear in the details and summary tables. Path sets may be defined with a path set id and include of any number of path ids. Product sets may be defined with a product set id and include of any number of product names. Lane sets may be defined with a lane set id and include of any number of lane sequences. Lane sequences may be further defined with a lane sequence id (unique within a given lane set), and include an ordered list of source-destination pairs, for which the destination of the prior lane within a sequence may be the source of the following lane.

In some embodiments, tables of database 102 comprise over 'n' number of data features, for example, 100 features. The data features may correspond to column attributes of tables of a relational database and the one or more data features may include without limitation distance-based features, time-based features, binary features, structured-based features, and flow-based features associated with any of site level, lane level and path level. TABLE 1 presents examples of data features that can be extracted, under program control, from data in tables of database 102 using the feature engineering unit 104, at the path levels or product levels:

Customer Service Distance is the distance from the last DC in a path to a customer. Interfacility Service Distance is all distance on a path from supplier to DC, excluding the distance to the customer. Total Service Distance is the sum of the preceding two values. Total Geo Distance is the total distance of a path based upon latitude-longitude geolocation values rather than journey distances. The Distance Ratio compares the Total Service Distance to geographic distance (where, for example, geographic distance is determined based on the Haversine formula); if the value is high, then a path could include unnecessary transportation. The three time-based features indicate the number of hours spent in transportation based upon links from the last DC to the customer, all time spent on the path other than the last hop to the customer, and the sum of the preceding two values. The binary features for modes, sites, and countries have been previously described. Binary features also can include a Boolean value specifying whether a path has multiple lanes and whether a path provides direct shipment with no intervening nodes. The structure-based features comprise metadata relating to the structure of a supply chain network including the number of unique modes, the total number of touch points, the number of DC touch points, the number of manufacturing touchpoints, and the number of countries for all lanes and paths of the network. The flow-based features comprise metadata relating to the movement of items in a supply chain network including total demand quantity, percentage of demand divided by quantity delivered, total weight, and total flow unit quantity. Other embodiments may use more or fewer features than the foregoing cost features or as shown in TABLE 1.

In one embodiment, user input may be received at feature engineering unit 104 from user computer 10 to select a response variable for later use in ML models and to execute inferential calculation of the response variable. An example of a response variable is transportation cost or inventory cost. In general, if the Total Flow Unit Quantity is high, the total transportation cost of the network will be high and often proportional to unit quantity. To supplement these insights, feature engineering unit 104 can be programmed to calculate a cost basis using factors such as PerFlowUnit, PerMile, PerPound, PerFlowUnitPerMile, PerFlowUnitPer-Pound, PerMilePerPound; these provide more useful insight

TABLE 1

| Extracted features at Path-Product Level to fit ML Model | | | | |
|---|---|---|---|---|
| Distance-based features | Time-based features | Binary features | Structure-based features | Flow-based features |
| Customer service distance | Customer service hours | Modes (parcel ground, Air, less than truckload (LTL)) | Number of unique modes | Total demand quantity |
| Interfacility service distance | Interfacility service hours | Sites (manufacturing (MFG), distribution center (DC), customer) | Total number of touch points | Percentage of demand/Quantity delivered |
| Total service distance | Total service hours | Is multiple lanes | Number of DC touchpoints | Total weight |
| Total geo distance | — | Direct shipment | Number of MFG touchpoints | Total flow unit quantity |
| Distance ratio (Total service distance/Total geo distance) | — | Country binaries | Number of countries | — | into total path costs. It should be understood that these factors are examples and other units of measurements are contemplated by this disclosure. For example, the factors may include weight, quantity, distance, quantity-distance, and distance-weight in any unit of measurement. For example, distance may be represented in kilometers rather than miles, weight may be represented in kilograms instead of pounds, and vice-versa.

Feature engineering unit 104 may be programmed to implement data pre-processing steps to improve the quality and value of data used in subsequent steps and units. Based on the response variable, feature engineering unit 104 may be programmed to remove irrelevant features from the data. Such irrelevant features may not be used to fit a machine learning model and/or maybe only for descriptive purposes or redundant. Examples of irrelevant features that may be removed include cost features, redundant features, and correlation-based features. For example, feature engineering unit 104 may be programmed to remove redundant features such as scenario identification (ID), path ID, product name, geo distance bucket, service distance bucket, distance ratio, demand percentage, total service distance, total geo distance, interfacility service distance, customer service distance, total weight, total demand quantity, cost features along with cost basis, total nodes in the path, site binary features (customer, distribution center (DC), manufacturing site (MFG)), total service hours, and any dummy features generated from sites. For correlation-based feature selection, feature engineering unit 104 can be programmed to drop features with a correlation with the response variable of less than a default correlation threshold. For example, one correlation threshold in configuration data or hard coded as a default could be "0.005". In an embodiment, Pearson correlation may be utilized to determine correlation-based feature selection.

In an embodiment, feature engineering unit 104 may be programmed to remove outlier values in the configuration data 22. Example outliers include a response variable with no cost or a cost of "0", or a response variable with a cost greater than the 99th percentile. For example, one or more paths having a business objective of "0" or a cost of "0" may be removed, for example, before fitting a machine learning model. Feature engineering unit 104 also may be programmed to execute one or more log transformations to rescale certain features on a logarithmic scale; in such a case, for example, extremely large values that may impact the efficiency, accuracy, fit quality, and/or behavior of a machine learning model may be minimized and comparable to the small values, which may allow for generalization of machine learning model results. These steps may improve the accuracy of the models at the inference stage. Moreover, feature engineering unit 104 may check to make sure there are adequate sites, lanes, paths, etc., completed before fitting a machine learning model. For example, if there are less than a threshold number (for example, 100) of complete paths, fitting the machine learning model may be skipped, and local and global scores (discussed below) may not be calculated. If this occurs, an error message may be generated and placed in a log.

Feature data from feature engineering unit 104 may be programmatically stored in an AI prescriptions data asset 110. Feature data from feature engineering unit 104 may be programmatically transferred to fit one or more path-level machine learning models 106. Machine learning models 106 may be, for example, tree-based models that use multiple decision trees to make one or more predictions. For example, a fit may be attempted with a random forest regressor or XGBoost algorithm that may be used for the machine learning model. The machine learning models may be used to help explain which feature(s) are causing a business objective cost to increase. For example, the machine learning models may be used to help explain which feature(s) are causing a business objective cost to increase or decrease relative to an average cost associated with a path. The machine learning models may also predict a cost variation. Feature data from feature engineering unit 104 may include one or more data features. In an embodiment, the one or more data features may be used to train the machine learning model 106 in a training phase prior to the evaluation of other data. In some embodiments, one or more data features from the feature engineering unit 104 may be extracted at any of the site, lane, and path level. Various data features are extracted or engineered to show descriptive insights at site, lane, and path levels and to create input data features for machine learning models 106. The data features may be extracted by feature engineering unit 104 to create a path details table in which an output of the C2S algorithm. The path details table may be reported at the lane level in the feature engineering unit 104. The path details table may be read into the prescriptive analytics workflow from an SCGM database of the model outputs database 102 and then aggregated at the path-product level. From this input, in some embodiments, various features may be extracted at site, lane, and path level. For example, the path details table includes paths where finished goods are stored as inventory at the DCs and never reach the customers. Similarly, to remove the infeasibility in the network, dummy sites may be added without any location details. The dummy sites contain incomplete paths and are removed from the path details before extracting path-level features.

Referring to TABLE 1, the path level features include distance-based features, time-based features, binary features, structure-based features, flow-based features, cost-based features, and business objective versions features. The distance-based features include, but are not limited to, customer service distance, interfacility service distance, total service distance, geo distance, distance ratio and distance traveled by each mode. Distance traveled by each mode may refer to a total service distance covered by a path using a specific mode, for example, air_distance or LTL_distance. The customer service distance refers to the last mile distance between the DC and the customer. The interfacility service distance refers to the service distance between MFG unit (or a supplier unit) and the last DC unit before delivering to the customer. The total service distance refers to the total distance between the start location (MFG) or supplier (SUP)) and the end location (customer). The geo distance refers to the great-circle distance in miles calculated between the start location (MFG or SUP) and end location (customer) using latitude and longitude with the help of the Haversine formula. The distance ratio is the total service distance divided by geo distance. The distance traveled by each mode refers to the total service distance covered by a path using a specific mode, for example, air_distance and LTL_distance.

The time-based features include, but are not limited to, customer service hours, interfacility service hours, and total service hours. The customer service hours refer to the time to deliver the finished product from customer facing DC to the customer. The interfacility service hours refer to the time to move the product from the start location (MFG or SUP) to customer-facing DC. The total service hours refers to the total time to ship the product from the start location (MFG or SUP) to the end location (customer).

The binary features include, but are not limited to, sites (MFG, SUP, DC, customer), countries and direct shipment. For example, different sites and countries in a path are converted into binary features. If a path has an MFG or DC or customer site present in a country, that country feature is assigned a value 1, else 0. For the direct shipment, if a product is shipped directly from MFG to a customer then direct shipment is marked as 1, else 0.

The structure-based features include, but are not limited to, the number of unique modes, the total number of touch points, the number of DC touch points, number of MFG touch points, modes, and number of countries in the path. The number of unique modes refers to the unique number of modes used by a product in a path. The total number of touch points includes the total number of DCs and MFG sites a product flows through in a path. The number of DC touch-points includes the number of DCs a product flows through in a path. The number of MFG touchpoints includes the number of MFG sites a product flows through in a path. The modes may include parcel, ground, air, LTL, etc. In an embodiment, the modes used in a path are summed up at a path/product level and converted to features. For example, if a path contains three lanes having one with air and two with LTL as modes, then air and LTL are assigned as 1, 2 respectively and rest of the modes are assigned 0. The number of countries in a path includes the number of countries a product flows through in a path.

The flow-based features include, but are not limited to, total demand quantity, demand percentage that refers to the demand quantity of a product in a path divided by the total demand quantity of the same product across all paths (network), total weight, and total flow unit quantity. The cost-based features include, but are not limited to, transportation cost, transportation plus in-transit inventory holding cost, production cost, sourcing cost, inbound warehousing cost, outbound warehousing cost, duty cost, carbon dioxide ($CO_2$) cost, facility inventory holding cost, in-transit inventory holding cost, inventory holding cost and total cost. The business objective versions refer to several variations, such as cost variations, that are used as a business objective to fit the machine learning model and the variations include, PerMile, PerPound, PerFlowUnit, PerFlowUnitPerMile, and PerMilePerPound. For example, a default business objective may be Transportation and In-transit Inventory Cost for PerFlowUnitPerMile cost variation. For example, for each of the cost based features, variations such as PerMile, PerPound, PerFlowUnit, PerFlowUnitPerMile, and/or PerMilePerPound may be calculated as features, and these variations may be used as a business objective to fit a machine learning model. It should be understood that these features are examples and other units of measurements are contemplated by this disclosure. For example, the features may include weight, quantity, distance, quantity-distance, and distance-weight in any unit of measurement. For example, distance may be represented in kilometers rather than miles, weight may be represented in kilograms instead of pounds, and vice-versa.

In some embodiments, various data features may be extracted or engineered to show descriptive insights at any of site, lane, and/or path level, and may be used to create input data features for the machine learning model at path level ML models 106. The data features may then be used to understand various cost drivers. In some embodiments, data may be split into training data and testing data. For example, in one embodiment, 80% of the data is used for training, and 20% is used for testing and evaluation. In one embodiment, the baseline model may have approximately 30 response variables.

In an embodiment, a baseline model structured as a linear regression classifier may be trained and used to compare the performance of the baseline model with the trained models 106. For example, the baseline model may be set to compare the performance of the machine learning model 106. Instead of fitting another machine learning model, a baseline model may be created that predicts the mean cost of the training data. The performance of the baseline model and the machine learning model may be compared on both train data and test data.

In one example experiment, a trained model had 165,072 paths with 26 features after pre-processing. The response variable represented the total transportation cost per pound of a commodity. Prior to fitting, finalized model parameters included, for example, model-based feature selection (which helps to identify the top features explaining the cost) set as false (model-based feature selection=false); train-test split as 80 percent training phase and 20 percent testing phase (train-test split=80/20); correlation threshold equals 0.005 (correlation threshold=0.005); hyperparameter strategy equals dynamic minimum samples split. In the training phase, 132,122 paths yielded a baseline error (MAPE) of 16.48% and an ML model error (MAPE) of 6.84%; in the test phase, 32,950 paths yielded a baseline error of 16.30% and an ML model error of 6.75%. In this context, MAPE refers to mean absolute percentage error which may be an error metric to evaluate the performance of the machine learning model with unknown data and for comparison with the baseline model (such as MAPE). For example, model-based feature selection may be set as false by default. By setting model-based feature selection as true, only features explaining 99% of the cost may be considered for local and global scores.

In some embodiments, methods may use a tree interpreter and/or shapley values that may quantify the importance of features and generate score values at a local level and global level. The shapley values may be referred from shapley additive explanations (SHAP) which is a method to explain model predictions from game theory; for example, SHAP approaches may be used to explain the prediction paths and quantify the magnitude and directionality of each feature in predicting cost. In an embodiment, FastTreeShap may be implemented which is an efficient way to compute feature contributions. For example, for the default machine learning model (XGBoost), FastTreeShap may be used to compute the feature local scores for each of the one or more data features to calculate scores for every path. The importance of individual features assists optimization by revealing, for example, whether a facility or a transportation mode has a greater or lesser impact on a lane. Local and global scores may help modelers understand cost drivers by quantifying feature scores for the one or more data features read by the prescriptive analytics workflow. In an embodiment, local score values are reported at a path level. In this context, the local score indicates feature importance at the path level. For example, local scores may represent the contributions of features in predicting the cost of a single path and may be calculated using SHAP for an XGBoost model; for example, local scores may be calculated for the XGBoost model using the FastTreeShap approach. General relative cost magnitude and cost direction of a feature. For example, one or more local scores may represent the contributions of feature(s) in predicting the cost of a single path and may be calculated using SHAP for an XGBoost model; for example, local scores may be calculated for the XGBoost model using the FastTreeShap approach. In some embodiments, local score(s) represent the general relative cost magnitude and cost direction of feature on top of the average prediction for any path in the network. For example, global scores may represent an aggregated score of feature contributions across all or a subset of paths of a model, and may be calculated by grouping the individual local features scores and averaging their absolute values across all or the subset of paths. For example, correlation between one or more feature values across all or a subset of paths may indicate an overall positive or negative contribution at a global level. A positive global score may attribute to an increase in cost and a negative global score may attribute to a decrease (i.e., reduction) in cost.

TABLE 2 illustrates example local score values for specified features of a single path, as indicated by the path identifier "100595".

TABLE 2

EXAMPLE LOCAL SCORE VALUES

| Path | Feature | Local Score | Feature value |
|------|---------|-------------|---------------|
| 100595 | Interfacility service distance | −0.234 | 3980.8 |
| 100595 | Interfacility service hours | −0.0169 | 336 |
| 100595 | Total weight | 0 | 11.9559 |
| 100595 | Total flow unit quantity | 0 | 11 |
| 100595 | Total demand quantity | 0 | 11 |
| 100595 | Unique mode number | 0.0291 | 2 |
| 100595 | Parcel | −0.0857 | 1 |
| 100595 | DC_1328_Almaty_Kazakhstan | 15.5646 | 1 |
| 100595 | DC_1194_Leipzig_Germany | 0.2663 | 1 |
| 100595 | Customer service distance | −1.7721 | 52 |

In TABLE 2, high positive scores indicate features that increase the cost of a supply chain, and high negative scores indicate features that help reduce the cost. The units of the Score Value column can be US dollars, other currencies, or a relative magnitude that is independent of currency. The example of TABLE 2 shows that using a DC in Kazakhstan is associated with a high node cost. A Feature Value of "1" is a binary indicator that the feature is present. For other features, the Feature Value may be an actual or calculated value in units that vary depending on the feature; for example, the Feature Value for "Interfacility Service Distance" in TABLE 2 can be in units of miles or kilometers, "Total Weight" can be in metric tons or Imperial tons, etc. Values in TABLE 2 can yield important insights for use in prescriptions. For example, the low value of "CustomerServiceDistance," with a magnitude of −1.7721 and a value of 52 miles or km, could suggest that the last DC is close to the customer. Or, whenever a Parcel is used, costs decrease.

In some embodiments, a logarithmic transformation of a business objective may be performed before fitting the machine learning model. For a potentially improved interpretation, local scores generated for features may be retained in a log-space when reporting. The business objective's true value and machine learning model predicted value may be converted to an original scale, for example, after applying a reverse transformation such as exponentiation. The true value and predicted value of the response may be reported in the original space after performing an inverse transformation. For example, to derive the model predicted value from local scores, the following calculation may be performed:

$$\text{Model Predicted Score} = \text{Exp(Sum of Individual Local Scores)} * \text{Mean Prediction}$$

In some embodiments, Mean Prediction is based on a non-logarithmic transformation. In some embodiments, global score values can be reported at the network level, aggregated across all paths. TABLE 3 illustrates example global score values for specified features; as with local score values, high positive values indicate a contribution to higher cost and high negative values indicate a feature that contributes to reduction in costs.

TABLE 3

EXAMPLE GLOBAL SCORE VALUES

| Feature_Name | Global_Score |
|--------------|--------------|
| CustomerServiceHours | −0.8267 |
| CustomerServiceDistance | 0.8138 |
| InterfacilityServiceDistance | 0.6042 |
| Intl_CZ_Parcel | 0.5064 |
| Parcel-Ground | −0.3513 |
| MFG_1275_Juncos_USA | 0.2947 |
| Parcel | 0.1450 |
| Parcel-2_Day | 0.0985 |
| UniqueModeNumber | 0.0634 |
| Parcel-3_Day | 0.0406 |
| InterfacilityServiceHours | 0.0267 |
| TotalWeight | −0.0252 |
| DC_1139_Memphis_USA | 0.0231 |
| DC_1301_Swedesboro_USA | −0.0228 |
| DirectShipment | 0.0142 |
| TotalFlowUnitQty | −0.0129 |
| TotalDemandQty | −0.0125 |
| DC_1328_Almty_Kazakhstan | 0.0088 |
| DC_1338_Modiin_Isreal | 0.0073 |
| DC_1194_Leipzig_Germany | 0.0043 |
| DC_1191_Singapore_Singapore | 0.0023 |
| DC_1146_Seoul_South Korea | 0.0016 |
| DC_1558_Jeddah_Saudi_Arabia | 0.0009 |
| DC_1161_Chennai_India | 0.0001 |
| MFG_1707_New_Cairo_Egypt | 0.0000 |

TABLE 3 can provide insights into cost drivers for a complete network. In the example of TABLE 3, the score values for the features "CustomerServiceHours" and "CustomerServiceDistance" can show, for example, the impact of last-mile service hours and service distance on transportation costs. Other scores can show the impact of modes of transport; for example, using "Parcel-Ground" service decreases the cost of a path, whereas the use of "Intl_CZ_Parcel" service will increase transportation costs in the example of TABLE 3. Features like "Parcel," "Parcel-2_Day," "UniqueModeNumber," and "Parcel-3_Day" show that choosing different modes will add to transportation costs. The values for nodes "DC_1328_Almaty_Kazakhstan" through "DC_1161_Chennai_India," all having positive score values, may assist in identifying those nodes of a supply chain network that add to the total transportation cost whereas other nodes with negative values like "Swedesboro" are reducing costs.

In some embodiments, the score values may be programmatically transferred to a scenario prescriptions unit 108, which comprises one or more sequences of stored program instructions that are programmed to consume the path-level models and descriptive insights to implement, asynchronously and/or in response to user selections or user input, three types of prescriptions. In some embodiments, the types of prescriptions include node-skipping, mode switching, and/or volume consolidation. For all three types of prescriptions, scenario prescriptions unit 108 may be programmed to form in-memory representations of multiple options, calculate costs, and determine which options to present.

In some embodiments, scenario prescriptions unit 108 may provide model generation that involves reading all, or a subset of, input data features and creating an object model including sites, lanes, and/or paths. As discussed above, the logic executed by scenarios prescriptions unit 108, which provides the functionality of scenarios prescriptions unit 108 as described herein, may be one or more heuristic algorithms (also referred to as heuristic searching algorithms). As such, the described functionality of scenarios prescriptions unit 108 may be implemented by one or more heuristic algorithms that may include one or more of the process steps and/or provide some or all of the described functionality of scenarios prescriptions unit 108 as described herein. In some embodiments, the input data includes data from SCGM Input Tables: e.g., Sites, Customers, Products, and Lanes; data from the SCGM Output Tables provided by Network Optimization and Cost to Serve runs: e.g., Customer and Interfacility Flows and Path Details; and/or data from the SC Rx (supply chain prescriptions) Data Asset Input Tables: e.g., Mode Types, Invalid Mode Switches, and Shipment Frequency. In some embodiments, the input data features may include, but are not limited to, features from one or more supply chain model input tables such as sites, customers, products, and lane tables, features from one or more supply chain model output tables provided by network optimization and cost to serve analysis runs that include customer and inter-site flows and path details, and features from one or more supply chain prescriptions data asset input tables including mode types, invalid mode switches, and shipment frequency. In some embodiments, some or all of the above data is mapped directly from the tables to the object model. In some embodiments, additional calculations may be performed to map data to the object model. In some embodiments, the supply chain model input tables contain data read directly from the database 102 and files generated by a network optimization input generation process. The network optimization input generation process may be a prerequisite before running supply chain prescriptions, and may involve input file generation where file(s) are generated from the SCGM database of database 102.

For example, for supply chain model input tables (which may include SCGM input tables when file(s) are generated from the SCGM database), data may be ingested in multiple ways. One way may be to read files directly from the database. Another may be to read from files generated by the network optimization input generation process. This process may be the same as the network optimization used to produce its input. The SCGM database may have scenarios, groups and multiple units of measures for values. Tables which are read directly from the database may include tables related to Sites and Customers. These tables may have no scenarios applied to them, and may be used for the latitude and longitude values of locations of Sites and/or Customers. Tables which are read from files generated by the network optimization input generation process may include tables related to Products and Transportation Arcs. The Transportation Arcs table may be an expanded version of the Transportation Policies table which may use, for example, the Site Sourcing Policies, Customer Sourcing Policies and/or Customer Orders (or Customer Demand) to determine which arcs in the network are feasible. The network optimization input generation process uses the process of reading data from the input features for the supply chain model input tables to produce its own input. In an embodiment, the object model may include scenarios, groups, and/or multiple units of measures for values that require the additional processing that occurs in the network optimization input generation process. The sites and customers tables may be read from the database 102, regardless of any scenarios that refer them. The sites and customer tables may be used for the latitude and longitude values of locations. The supply chain input tables may also include products and transportation arcs tables that, for example, may be read from files or from the database. For example, an "arc" may be a "lane." The transportation arcs table may be an expanded version of a transportation policies table which also uses site sourcing policies, customer sourcing policies and customer orders (or customer demand) to determine which arcs/lanes in the network are feasible. For example, the transportation arcs may be an input file generated from transportation policies (database) table where some site, product groups, and/or scenario items can be expanded. In some embodiments, the one or more supply chain model input tables may include one or more lane tables for collecting values for lanes. In some embodiments, during model generation, additional values required for lanes may be calculated. For example, the additional values for lanes may include a geographic distance value and a transportation cost rate. In some embodiments, the geographic distance value may be calculated using latitude and longitude values to calculate the distance between two sites. In some embodiments, the geographic distance may be a great circle distance, using 3,959 miles for the Earth's radius and 1.17 for the circuitry factor. In some embodiments, if the latitude or longitude is missing from one or both of the sites, the geographic distance may not be calculated, and the result will be a distance of zero. For example, the geographic distance may be used to make comparisons to newly created lanes between two sites for which there are no existing lanes, and to thereby allow for a one-to-one comparison of distances and cost rates based on the distance.

The transportation cost rate may be defined as, for example, the transportation cost per mile/per unit and calculated for each lane. The transportation cost rate of each lane may be used to estimate the transportation cost of all newly created lanes. In some embodiments, the transportation cost rate may be calculated as:

$$\text{total transportation cost/geo distance/flow quantity}$$

In some embodiments, the transportation cost rate may be calculated as per user input as:

$$\text{total transportation cost/business objective basis value}$$

The transportation cost rate may be calculated for each lane and may be used to estimate the transportation cost of newly created lanes. The business objective basis value may be any value that is or is based on, for example, quantity, weight, distance, quantity-distance, and/or distance-weight, and can be in any unit of measurement (e.g., miles, kilometers, kilograms, pounds, etc.). The total transportation cost may be as reported in an Interfacility or Customer Flow table and the business objective basis may be defined in the cost parameters. The business objective basis value may be calculated for the lane using the geo distance, flow quantity, and product weight as applicable to the basis. In one example, if the business objective basis value is zero, the resultant transportation cost rate is also zero. The associated lane, then, may not be used to estimate the transportation cost rate for new lanes, and may not be eligible for prescription analysis. The total transportation cost value and/or flow quantity value may be reported in an InterSite or Customer Flow table. For example, if the geographic distance (geo distance) or flow quantity is zero, the resulting transportation cost rate is also zero; in such a case, the lane may not be used to estimate the transportation cost rate for new lanes and/or may not be eligible for prescription analysis. In some embodiments, lanes are sorted by source, destination, product, and/or mode to guarantee deterministic results. This sorting may occur because, for example, for a node-skipping scenario, the mode selection process may choose the mode from the first lane that meets the criteria (using for example, local lane search); here, for example, the lanes stored in a different order for each run, the results may vary.

The supply chain prescriptions data asset input tables may include mode distance thresholds used for mode selection. The mode distance thresholds may be used within the check mode validation for mode selection. In some embodiments, the thresholds may restrict or prohibit the selection of modes based on the geographic distance of the new lane. In some embodiments, the geographic distance may be required to be within the mode's lower and upper bound, inclusive, to be eligible for mode selection. In some embodiments, the lower and upper bounds may be calculated using an existing lane's geographic distances and each lane may be grouped by its mode. The lower bound threshold for a mode may be obtained from the minimum geographic distance of all the lanes in a group. The upper bound threshold for a mode may be calculated by:

$$\text{maximum geographic distance} + \text{percent of average} * \text{average geographic distance}$$

In some embodiments, the maximum geographic distance and average geographic distance refer to the value of the lanes in the mode's group, and the percent of average may be a non-exposed parameter set at 0.10, for example.

In some embodiments, the supply chain prescriptions data asset input tables include mode types, where each mode name may be classified into a particular mode type. Mode types include, for example, air mode, ground mode, ocean mode and other mode. In some embodiments, any modes left unclassified are classified as "other," which may avoid limiting prescription generation.

In some embodiments, the supply chain prescriptions data asset input tables include invalid mode switches. In some embodiments, invalid mode switches identify specific mode switches that are not allowed. In some embodiments, invalid mode switches are used when necessary to identify specific mode switches as not allowed. For example, during prescription generation, invalid mode switches may prevent the mode selection process from selecting certain modes based on the original mode of the path or lane being analyzed. For example, if one invalid mode switch is from Mode 1 to Mode 2, then the mode selection may not choose Mode 2 if the original mode is Mode 1. Invalid mode switches may be specified at many levels, and in some embodiments, lane level (for example, source, destination, product, original mode) may be the most detailed. For example, in lane expansion, any of source, destination, product, and/or original mode may be entered as ALL. The invalid mode can also be entered as ALL, in which case all modes are invalid for lanes that match the lane specification.

In some embodiments, the supply chain prescriptions data asset input tables include shipment frequency. The shipment frequency may be utilized as a constraint added on mode selection based on shipment frequency. The shipment constraints may be specified by a lower bound and/or upper bound which may be absolute and/or relative. In some embodiments, the more restrictive of the relative or absolute bound may be used as the minimum and maximum. In some embodiments, there must be at least one bound for the constraint to be in effect. The shipment frequency may be calculated as:

> total flow quantity over the lane or estimated for the path segment/shipment size as given by transportation policies In some embodiments, the shipment frequency may include lane expansion that may be used for the shipment frequency constraints and invalid modes tables. Used in this way, lane expansion may allow data to be entered without fully specifying each lane. In some embodiments, one type of expansion uses the "ALL" keyword. In some embodiments, for each lane column (for example, source, destination, product, current or original Mode, for example), a single value or "ALL" can be selected. For example, when "ALL" is selected for a column, that lane is expanded to a set of lanes for each unique value for that column. For example, when a single value (instead of "ALL") is selected, only that selected value is included.

In some embodiments, another type of lane expansion uses the mode type. For example, any of the mode columns may use the mode type instead of a mode name. In this case, for example, the expansion may include all lanes with modes of that mode type, subject to the rest of the lane specification. TABLEs 4a and 4b show an example "ALL" lane expansion. The TABLE 4a shows an example of existing lanes in the model:

TABLE 4a

| Lane ID | Source | Destination | Product | Mode |
|---------|--------|-------------|---------|-------|
| Lane1 | SiteA | SiteB | Product1 | Mode1 |
| Lane2 | SiteC | SiteB | Product1 | Mode1 |
| Lane3 | SiteC | SiteD | Product1 | Mode1 |

If the lane specification in one of the input tables looks like the following of TABLE 4b, then the lane expansion will include Lane1 and Lane2; this is because in TABLE 4b, the destination is specified as Site B with the product as Product 1 and mode as Mode 1, and Lanes 1 and 2 in TABLE 4a also list the destination as Site B, the product as Product 1, and mode as Mode 1.

TABLE 4b

| Source | Destination | Product | Current Mode |
|--------|-------------|---------|--------------|
| ALL | SiteB | Product1 | Mode1 |

Another type of lane expansion is the Mode Type. Any of the mode columns may use the Mode Type instead of a mode name. In this case the expansion will include all lanes with modes of that Mode Type, subject to the rest of the lane specification.

Figures 4A, 4B:
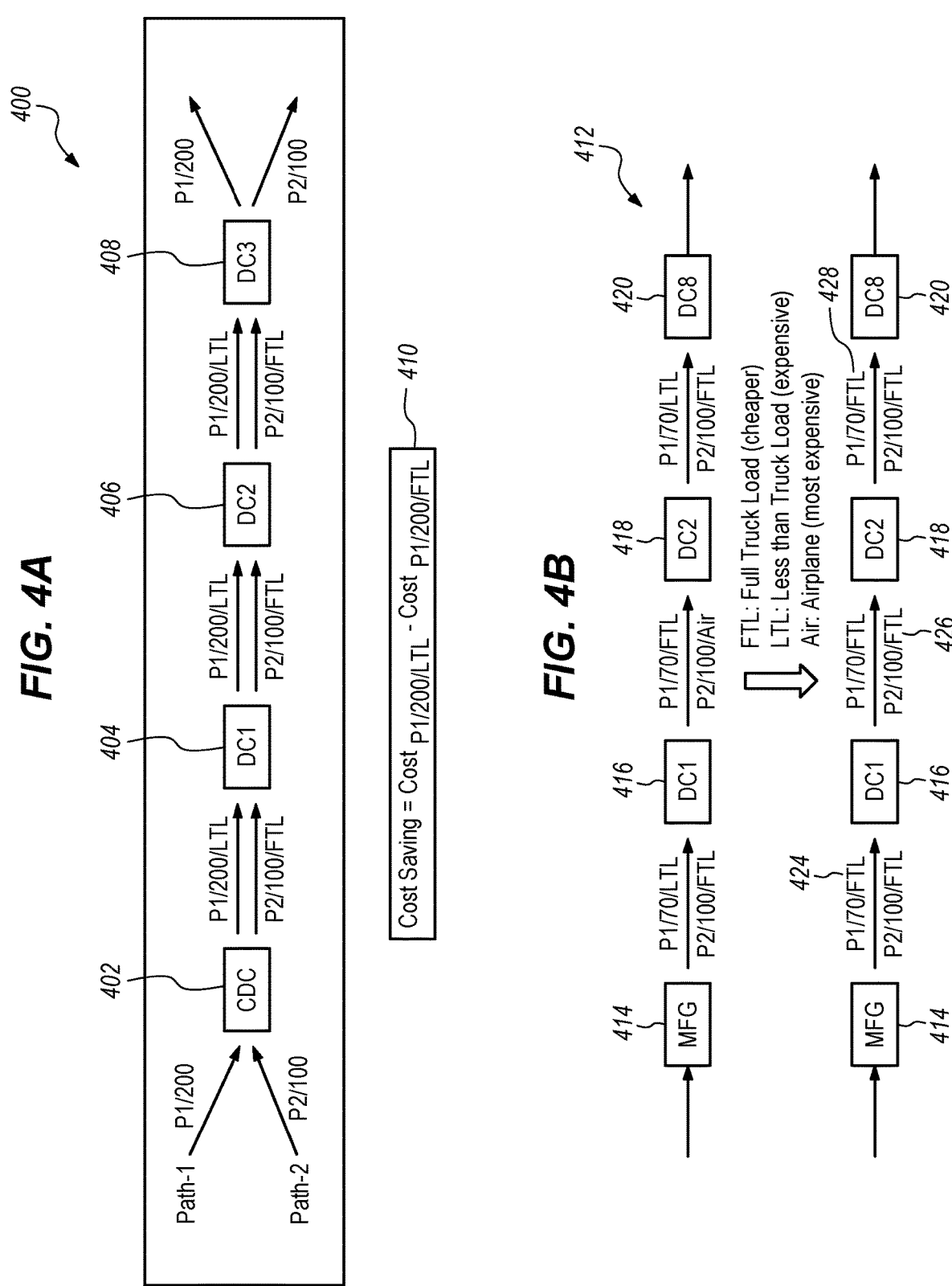
FIG. 4A illustrates an example cost savings analysis for an example supply chain network.
FIG. 4B illustrates an example of cost-saving calculation, according to one embodiment.
Figure 4C:
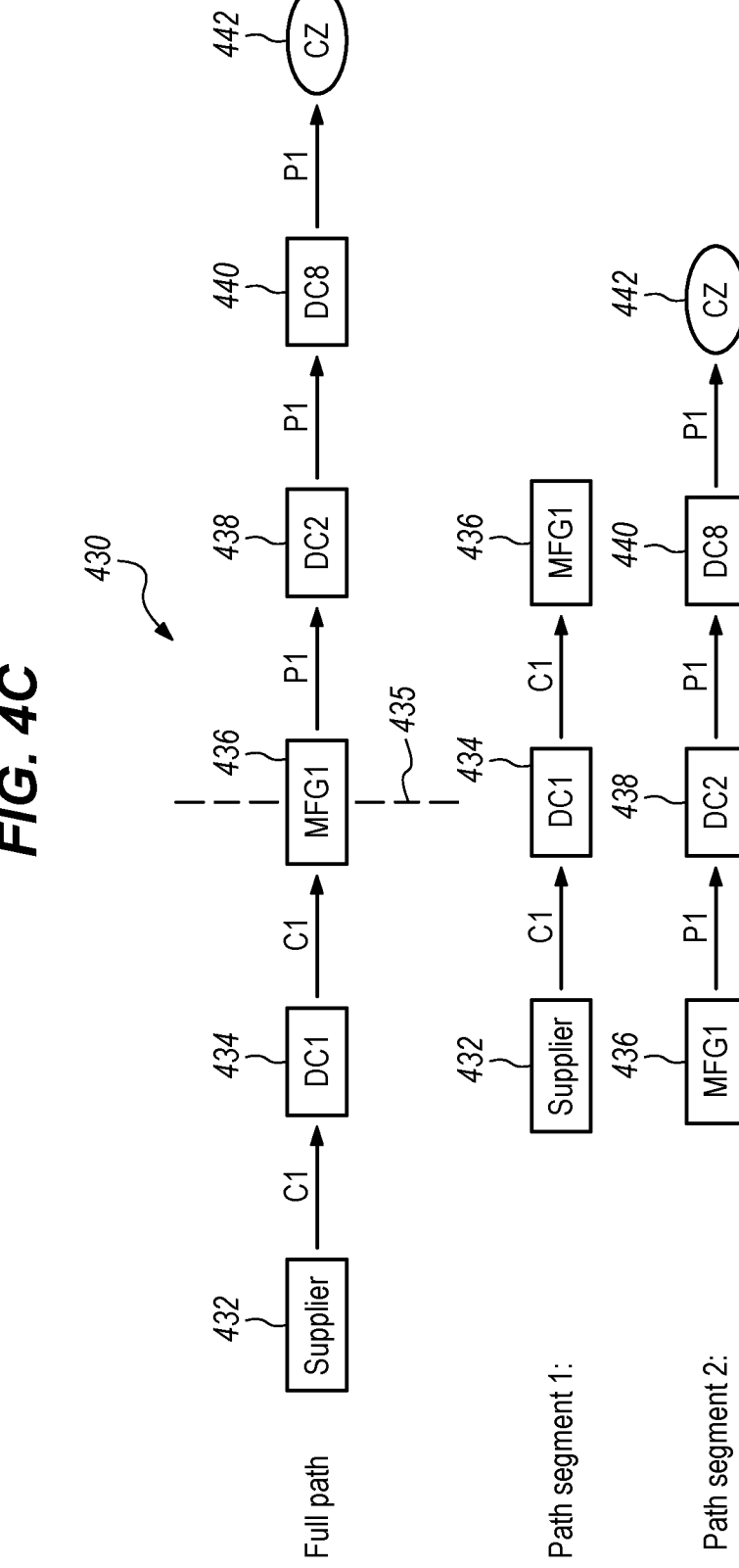
FIG. 4C illustrates an example of cut-path segments, according to one embodiment.

FIG. 4C shows a cut path example 430 for segmenting the path into path segments according to some embodiments. The full path with a blueprint for manufacturing (including for, example, a bill of materials (BOM)) may be split into path segments, for example, path segment 1 and path segment 2, so that each path segment includes one product. For example, a BOM may provide one or more components that are not shipped by themselves but that may be combined to form a product. Referring to FIG. 4C, the full path includes a supplier 432 connected to DC1 434 over a component C1. DC1 434 is connected over the same component C1 to MFG1 436. MFG1 436 is connected to DC2 438 over product P1. DC2 438 is connected to DC2 440 over the same product P1. DC2 438 is connected to customer zone (CZ) 442 over the same product P1. A cut path 435 may be created at MFG1 436. The cut path 435 creates a path segment 1 with the supplier 432, DC1 434, and MFG1 436 connected over component C1, and a path segment 2 with MFG1 436, DC2 438, DC3 440, and CZ 442 connected over product P1.

In some embodiments, for path analysis, the paths that C2S analysis may provide may have more than one product if there is one or more BOMS in the model. During prescription generation, each path may only have one product. The path analysis routine may divide the paths into single product paths, and group similar paths together to reduce a search space. In some embodiments, grouping may only occur for paths with more than one lane, or more than one non-customer-facing lane if the Exclude Customer Facing Sites From Node Skipping parameter is set to True. For example, paths may be grouped if their lane sequences match. A lane may refer to a unique source, destination, product, and/or mode. In some embodiments, a group may be a group of only one path. In some embodiments, the total transportation cost for a path group may also be calculated. In some embodiments, sites that support air or ocean modes based on existing lanes in a model may be updated. For example, the updating may be the same or similar to how the Port Database evaluation may update sites based on proximity to ports.

In some embodiments, the scenario prescriptions unit 108 may perform node skipping. An example of node skipping includes determining a new direct lane between a first node and a second node, skipping a third node that had been involved in the lane or path in a baseline model. For example, for node skipping, if a path includes lanes that link nodes A, B, C, D, E, the scenario prescriptions unit 108 is programmed to test whether nodes B, C, D can be skipped, alone or in all possible combinations or permutations that represent more direct transportation lanes. Further, in some embodiments, scenario prescriptions unit 108 is programmed to concurrently test all available modes of transportation for the lanes in the combination and calculate relevant costs. If a particular potential lane represents reduced cost, then that lane becomes part of an output prescription.

In some embodiments, scenario prescriptions unit 108 (e.g., the Prescriptions engine) may utilize one or a combination of the following: (1) one or more heuristic algorithms that estimate the cost(s) of new lanes; (2) one or more machine learning models that predict one or more rates associated with new lanes; and/or (3) community data (e.g., data from or relevant to multiple customers) and third-party data that is used to determine the one or more rates of new lanes.

In some embodiments, scenario prescriptions unit 108 uses parameters, such as those shown in TABLE 5a and/or 5b below. Some parameters may be used to change the behavior of the supply chain model while others may be used as thresholds or as part of cost-saving calculations, for example. In some embodiments, parameters may be exposed to an end user and available for them to view, while other parameters may be internal to the model and not exposed to an end user. TABLE 5a shows example parameters that may be exposed to users and available to users:

TABLE 5a

| Parameter name | Default value | Description | Usage |
| --- | --- | --- | --- |
| Business Objective | Transportation Cost + In-Transit Inventory Cost Savings | Defines the costs which should be used to calculate the total cost savings of a prescription. | Mode Selection |
| Business Objective Basis | Quantity-Distance | Defines the denominator in the transportation cost rate calculation | Global cost and time estimates |
| Sites to exclude from scenario recommendation | Null | These sites may not be skipped in node-skipping analysis | Node-skipping scenario validation |
| Exclude customer facing sites from node skipping | True | For node skipping, do not skip the sites facing the customer node in a path when this parameter is True. For mode switching, do not generate prescriptions for customer facing lanes when this parameter is True | Node-skipping analysis, lane selection |

The TABLE 5b shows parameters that may be internal to the model only and may not be exposed or available to users:

| Parameter name | Default value | Description | Usage |
| --- | --- | --- | --- |
| PortRadiusCutoff | 80 (miles) | Defines a site's proximity to a port if geo distance is within this value | Port database |

-continued

| The TABLE 5b shows parameters that may be internal to the model only and may not be exposed or available to users: | | | |
|---|---|---|---|
| Parameter name | Default value | Description | Usage |
| MaxPathNumWithoutFiltering | 1000 | Determines whether the path search space for node skipping analysis should be filtered if the number of paths is greater than this value | Path selection |
| MaxLaneNumWithoutFiltering | 1000 | Determines whether the lane search space for mode switching analysis should be filtered if the number of lanes is greater than this value | Lane selection |
| SelectTopsCutOff | 0.10, or alternatively may be a dynamic value | Defines the top percentile of paths and lanes to use when filtering | Path selection, lane selection |
| MinCostSaving | 0 | A node skipping scenario must have greater than this value of cost savings | Node-skipping scenario validation |
| NewCostRatioCutoff | 0.85 | The new cost for a node skipping or mode switching scenario must be no greater than the original cost multiplied by this value | Node-skipping scenario validation, mode switching scenario validation |
| NewLaneDistanceCutoffRatio | 0.85 | The new distance for a node skipping scenario must be no greater than the original distance multiplied by this value | Node-skipping scenario validation |
| MinDistanceOfModeSwitching | 5 (miles) | The geo distance of a lane must be greater than this value for mode switching analysis | Mode switching analysis |
| MinAirModeDistance | 100 (miles) | Any new lane that uses a mode type of Air must have a geo distance greater than this value | check mode validation |

For example, the business objective parameter may reflect one of the following options: transportation cost+in-transit inventory cost savings; or transportation cost savings. The business objective parameter may be used in mode selection to select the mode having the lowest cost in terms of the business objective represented by the business objective parameter. The business objective parameter may also define what may be included in the total potential cost savings.

For example, the business objective basis may reflect one of the following options: quantity, weight, distance, quantity-distance, or distance weight. The business objective basis may be used to calculate the transportation cost rate, which may be used to calculate the global cost and time estimates and may be reported in the prescription output.

2.2 Example Scenario Prescription Processes

In an embodiment, using the results of AI-based analysis coupled with a heuristic searching algorithm may yield new scenarios for supply chain efficiency or cost savings. In one embodiment, a scenario prescription algorithm offers high-performance and accuracy prescriptions that perform any of the node-skipping scenarios, the mode switching scenario, and the volume consolidation scenario. Embodiments are architected to perform well in the face of a large searching space, multiple transportation modes that require independent cost analysis, and to provide cost estimation and ranking, even when data is complex with many dependencies among nodes.

The analysis may include pre-processing and prescription generation. In pre-processing, calculations may be performed that help prescription generation, such as finding point estimates for the transportation cost rate and transportation time rate over product-mode pairs. The prescription generation may be where the node skipping, mode switching and volume consolidation scenarios are created. Prescription generation may include generating prescriptions such as Node Skipping, Mode Switching, and/or Volume Consolidation.

Figure 2:
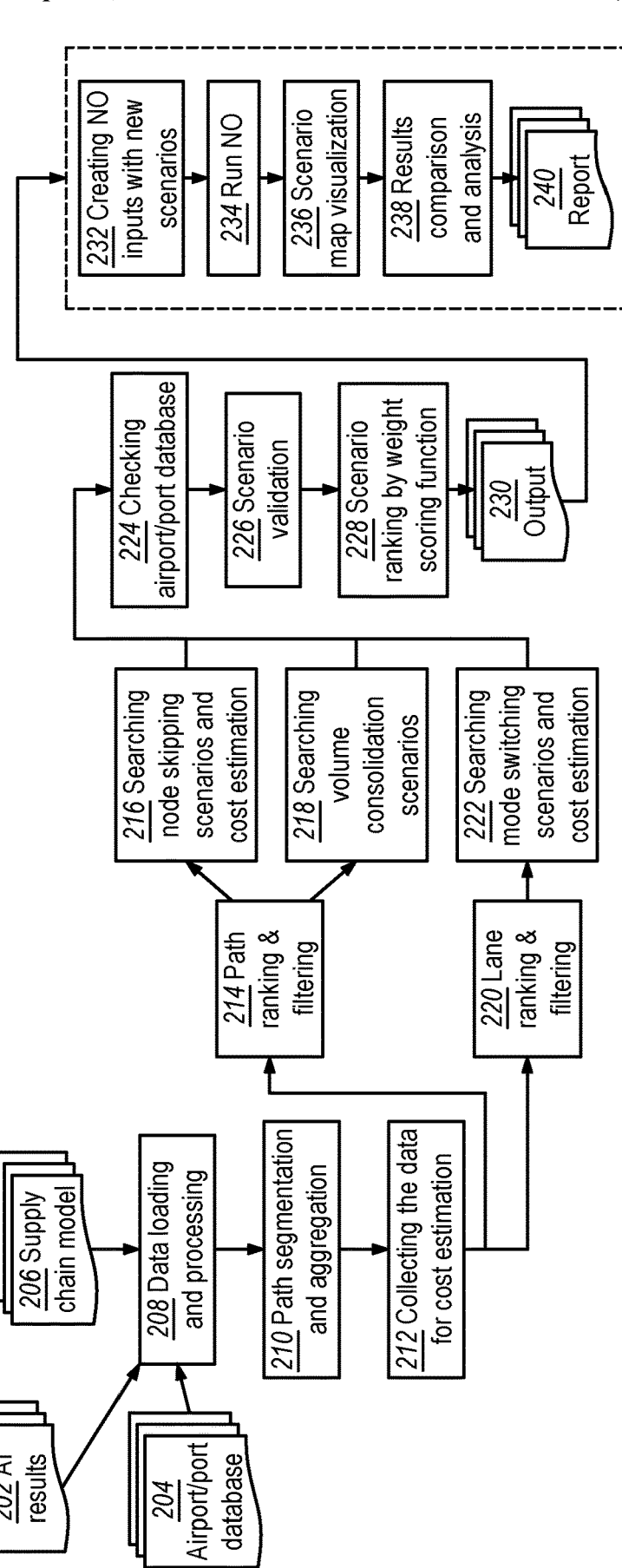
FIG. 2 illustrates a process of using artificial intelligence techniques to generate prescriptions for modifications to a supply chain network, in one embodiment.

FIG. 2 illustrates a process of using AI techniques as well as, for example, one or more heuristic algorithms, to generate prescriptions for modifications to a supply chain network, in one embodiment. FIG. 2 and each other flow diagram herein are intended as an illustration of the functional level at which skilled persons, in the art to which this disclosure pertains, communicate with one another to describe, and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs. FIG. 2 can represent functions implemented using methods, classes, functions, or other sets of program instructions of the supply chain network analysis application 16 (FIG. 1A).

In an embodiment, AI results 202 from other AI models, an airport/port database 204, and a baseline supply chain model 206 provide inputs to a data loading and processing step 208. In one embodiment, data loading and processing step 208 may be implemented using the scenario prescriptions unit 108, which may be programmed to create and store digital representations of the prescriptions, and/or one or more updated network models associated with the supply chain network, in AI prescriptions data asset 110. In some embodiments, the scenario prescriptions unit 108 may be programmed to assess quantities of paths in the range of 50,000 to 4 million paths. Because of the size of the search space, scenario prescriptions unit 108 may be programmed to query one or more external data sources to determine, for example, whether a particular path can use a particular transportation mode. For example, in some embodiment, the scenarios prescriptions unit 108 may be programmed to query a third-party global airport/port database to determine whether both the source node and destination node for a particular lane or path may use ocean or air transportation. In an embodiment, the airport/port database 204 comprises or is derived from independent, third-party online databases of transportation, such as THE GLOBAL AIRPORT DATABASE, which is available at the time of this writing on the internet at the domain PARTOW.NET, and WFP-GEONODE. In some embodiments, the airport/port database 204 comprises data downloaded from the foregoing sources and subjected to validation by cross-checking values received from the sources against other sources; in one experimental embodiment, the airport/port database had approximately 9,453 records each representing a different airport or port. The port database 204 consists of airports, seaports, and their latitudes and longitudes. In an embodiment, the port database 204 may be used to determine whether a mode is a realistic choice. In an embodiment, a mode-type assignment routine is utilized to determine whether the site is proximal to the port for air or ocean modes. If the site is sufficiently close to an air or sea port, then an air or ocean mode may be used in conjunction with the site. The mode type assignment routing compares each site within the model to the port database 204. If the site is within proximity to any airport, the site is considered to support air modes. If the site is within proximity to any seaport, the site is considered to support ocean modes. In some embodiments, airport/port database 204 may utilize the global databases to determine whether a site is within proximity to a port by calculating the geographic distance between the site and the port, and then comparing the distance to an internal parameter PortRadiusCutoff. If the distance is less than or equal to the PortRadiusCutoff, the site is within the proximity to the port that is used for both airport and seaports. In some embodiments, average cost and time may be determined to determine a realistic mode choice. In some embodiments, median cost and time may be determined to determine a realistic mode choice. For example, the cost rate and speed for the new lane may be considered because lanes are associated with unique cost rates and speeds. Averaging over the existing lanes provides good estimates for cost rates and time values. The cost rate and time values are computed based on two levels of averages, including but not limited to, product-mode pairs and modes. For example, in preprocessing, the cost rate and time values are computed based on two levels of averages, including but not limited to, product-mode pairs and modes. For each of the product-mode pairs and modes, the cost rate, time rate, and weight cost rate are computed. In an embodiment, the customer-facing lanes may be excluded from the average. In an embodiment, the time rate average may be computed by dividing each lanes transportation time by the geographic distance of the lane. For example, if the lane's geographic distance is less than 30 miles, the speed is set at 1 hour per mile. The lane's geographic distance and transportation time may be greater than zero for including in the average. The cost rate average may be computed using each lane's transportation cost rate. The lane's geographic distance and cost rate may be greater than zero for inclusion in the average. The weight cost rate average may be computed by dividing each lane's transportation cost rate by the weight of the lane's product. If the transportation cost rate is defined as cost per mile per unit, then the weight cost rate is defined as cost per mile per unit per pound. In some embodiments, outlier removal may take place, where outlier values may be removed from transportation cost rates. For example, outliers that the $99^{th}$ percentile for each mode may be detected and removed prior to calculating the mean transportation cost rate for produce-modes and modes. It should be noted that the above aspects of this paragraph may be used in preprocessing. For example, the port database may be used in preprocessing such as in a preprocessing step that is performed with the mode type assignment routine.

The baseline supply chain model 206 may be received from the available data storage of an entity that owns or operates system 100 of FIG. 1A, FIG. 1B, or from user computer 10 or a client or customer of the entity. The baseline model 206 describes an entity's current supply chain network and interactions among nodes of the network. For example, the baseline model 206 may include transportation policies, available transport modes, and optimum numbers of units that flow between nodes in a supply chain network, on specific lines and paths using specific modes of transport. For flows of product units from a manufacturing facility to a customer, the baseline model 206 may specify the capacity of individual plants to produce portions of a total number of units required in a customer order, which transport modes are available, which DCs represent the best path to the customer, and so forth.

After data loading and processing step 208, control transfers to block 210 at which supply chain network analysis application 16 may be programmed to execute path segmentation and aggregation, which may comprise dividing path data in database 102 into lanes or aggregating lanes into paths. In some embodiments, dividing path data may comprise retrieving a row from database 102 specifying a path in terms of start location and end location, transmitting a programmatic call to an API of a map service of a third-party networked server, providing the location data and a means of transport such as air, ground, or sea, and receiving a response specifying a route from the start location to the end location using the specified transport means and having a plurality of route segments. Each route segment may be stored as a lane.

At block 212, supply chain network analysis application 16 collects data for cost estimation, which may comprise calculating the cost basis values that have been previously discussed.

At block 214, supply chain network analysis application 16 may be programmed to execute path ranking and filtering. At block 220, supply chain network analysis application 16 may be programmed to execute lane ranking and filtering. Both block 214 and block 220 may be programmed to reduce the search space by ranking and filtering paths and lanes according to cost, travel time, length, or other criteria, for separate purposes. For example, in an embodiment, path ranking and filtering, at block 214, supports searching node-skipping scenarios and cost estimation at block 216, and searching volume consolidation scenarios at block 218, in the manner previously described. Further, in an embodiment, lane ranking and filtering at block 220 support searching mode switching scenarios and cost estimation at block 222.

At block 224, supply chain network analysis application 16 may be programmed for checking the airport/port database 204 to verify that the proposed new lanes and paths are capable of transportation service.

At block 226, supply chain network analysis application 16 may be programmed to execute scenario validation. In some embodiments, the validation may comprise transmitting a plurality of API calls to various networked servers to confirm that nodes exist, that routes exist, and that locations are valid, as well as transmitting one or more database queries to verify that a total time for transiting a scenario is compatible with user or enterprise requirements for transit times.

At block 228, supply chain network analysis application 16 may be programmed to execute scenario validation using a weighted scoring function, resulting in creating and digitally storing output 230 in AI prescriptions data asset 110. In some embodiments, any known weight-scoring function may be used based on the prioritization of attributes that may vary among enterprises; for example, one enterprise may prioritize cost, and another could prioritize time or the use of a particular distribution center.

At block 232, supply chain network analysis application 16 may be programmed to create network optimization ("NO") inputs for use with new scenarios. At block 234, supply chain network analysis application 16 may be programmed to execute network optimization. In some embodiments, the network optimization at block 232, block 234 may use existing NO algorithms, such as genetic algorithms, knowledge-based genetic algorithms, or others, to inspect prescriptions in AI prescriptions data asset 110 and apply one or more transformations or modifications. At block 236, supply chain network analysis application 16 may be programmed to execute scenario map visualization, which can comprise generating and transmitting presentation instructions to the user computer 10 to present a comparative display of the baseline model 206 and the prescriptions in terms of cost or the values of TABLE 2, TABLE 3. At block 238, supply chain network analysis application 16 may be programmed to execute results comparison and analysis and to generate one or more reports at block 240.

As an example, output 230 may represent a number of scenarios or prescriptions that may be too large for human evaluation. For example, one experimental implementation yielded about 2,000 node-skipping scenarios, 1,000 volume consolidation prescriptions, and 3,000 mode switching prescriptions for a complex network. With a total of 6,000 prescriptions, the number of changes to the network could be too large to implement in practice, or the customer might specify that it only can implement 100 changes. Therefore, in some embodiments, each prescription includes a value representing estimated potential cost savings. The supply chain network analysis application 16 may be programmed to generate and transmit presentation instructions to the user computer 10 to present all the prescriptions, ranked according to the cost savings estimates values, in a ranked list that includes each cost savings estimate value near a corresponding prescription.

Furthermore, in one embodiment, supply chain network analysis application 16 may be programmed to read a stored configuration value specifying a customer-specific maximum number of changes, to read the total prescriptions that have been stored in AI prescriptions data asset 110, and to automatically create and store an updated supply chain model in existing tables of database 102 that the supply chain modeling application 24 access and use. In some embodiments, path 26 and the other paths between elements in FIG. 1A represents the programmatic operation of the supply chain network analysis application 16 to read selected prescriptions from AI prescriptions data asset 110 and update values in rows, columns, or tables of database 102 that the supply chain modeling application 24 controls. For example, cost values or mode values may be updated for specified lanes or paths.

Automatically under program control, or in response to user input, the supply chain modeling application 24 may communicate specific change orders, updated configuration data, or alerts or notifications to supply chain node 18 and/or node configuration 20, using programmatic calls, push notifications, POST calls, database SELECT queries, email, or other communications channels. In response, supply chain node 18 can change configuration automatically or with manual review, approval, and action. An example update is to change node configuration 20 by updating a database table at the supply chain node 18 to specify that the node must use an air carrier, rather than ocean transport, for a specified commodity or product that is destined for another specified node.

Figure 3:
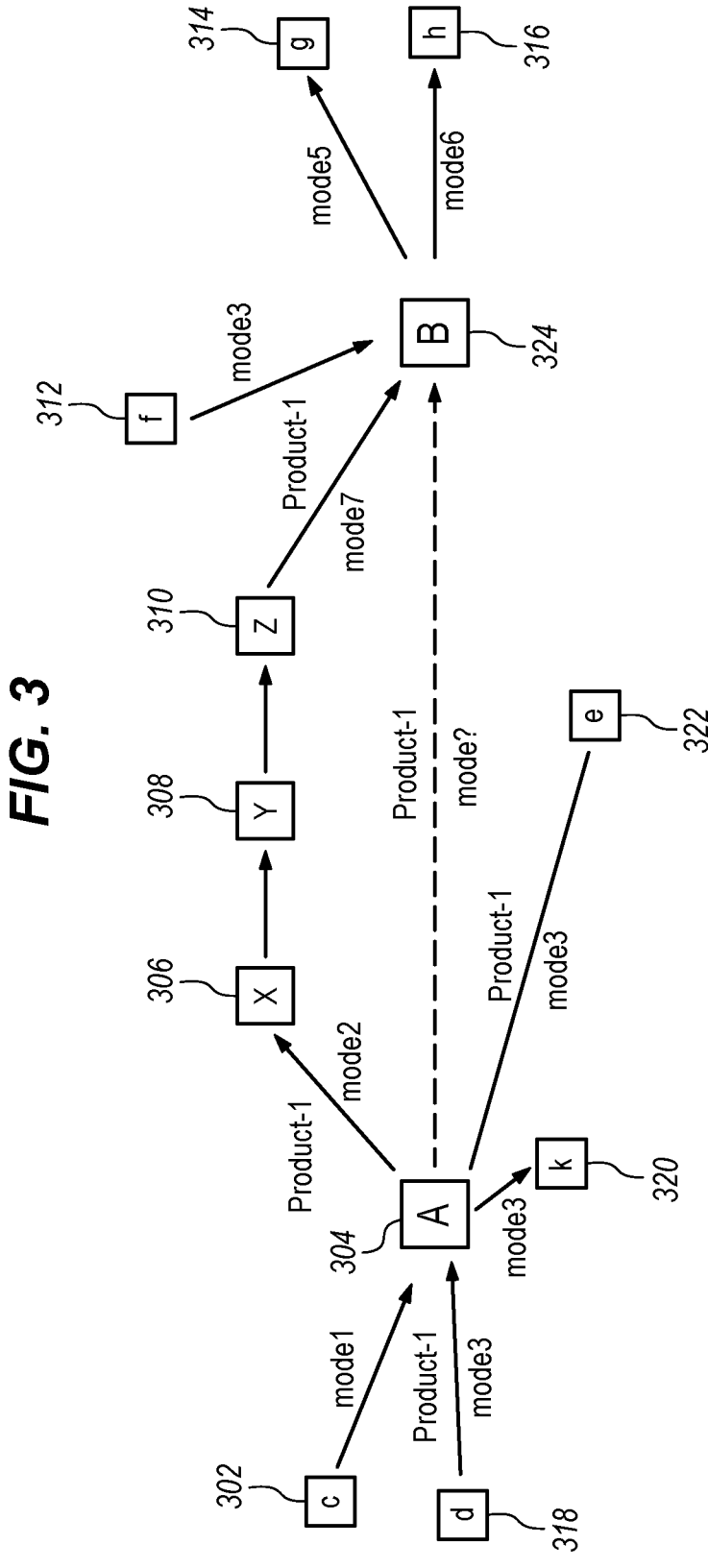
FIG. 3 illustrates an example supply chain network with a node-skipping scenario.

FIG. 3 illustrates an example supply chain network with a node-skipping scenario. In some embodiments, a goal of node skipping is to create new direct connections between two sites that would result in cost savings if the direct connection were to be used, rather than a path segment with multiple nodes. For example, in node skipping, the search space may include paths generated by C2S. The search space may be reduced by a ranking or filtering operation for path selection. Each path may be examined for every permutation of node skipping possible. For example, each permutation is a node-skipping scenario, which may be checked for feasibility and adequate cost-saving potential. If the node-skipping scenario passes these checks, the node-skipping scenario may be provided to the user in the output. For node-skipping analysis, in some embodiments, each path selected may be inspected for node-skipping opportunities. Moreover, in some embodiments, each site within a path are candidate sites that may be skipped except the starting site, the ending site, and the customer-facing site if the parameter excluding customer-facing sites from node skipping is true and there exists a customer-facing site on the path. In some embodiments, the paths are grouped if their lane sequences match. The lane may refer to a unique source, destination, product, and mode. Path groups may be grouped by only one path in some examples. The total transportation cost for the path group may also be calculated for path analysis. In an embodiment, sites that already comply with air or ocean modes based on the existing lanes in the model are updated, similar to how the port database 204 evaluation updates the sites based on the proximity to ports. In some embodiments, all permutations of skipping the sites may be considered. For example, if a path does not include a customer-facing site and includes four sites named site 1, site 2, site 3, and site 4, then three node skipping scenarios may considered: (a) skip site 2; (b) skip site 3 and (c) skip site 2 and site 3. In some embodiments, a node skipping scenario for a path may be defined by the start site (for example, a site on the path immediately before the first skipped site) and the end site (for example, a site on the path immediately after the last skipped site). For example, in a three-node skipping scenario example, the start and end sites may include, for example, (a) site 1 and site 3; (b) site 2 and site 4 and (c) site 1 and site 4. In an embodiment, path selection may be determined for the node skipping and node skipping analysis. In path selection, the search space of paths to be examined by node skipping is ranked by the transportation cost of the paths. For example, the path groupings created in path analysis for path selection are ranked by their total transportation cost over the path in the group, and the paths with the highest costs are selected. In some embodiments, in scenarios where the number of path groups is less than MaxPathNumWithoutFiltering, all path groups are selected, otherwise, the path groups are filtered. In an embodiment, a constraint "SelectTopsCutOff" is used as a percentile that is used to filter paths. In some embodiments, only the path groups in the top percentile given by "SelectTopsCutOff" in terms of total transportation cost are selected. In some embodiments, only one path from each group is selected for node-skipping analysis. For example, assuming the model contains 300,000 path groups that are used for ranking and filtering the path groups, the following steps may be used to rank and filter the path groups. The steps for ranking and filtering the path groups may include finding 10% (the value of SelectTopsCutOff) of 300,000, which is 30,000, that is rounded up if it's not the whole number. The next step is to find the total transportation cost for the 30,000$^{th}$ path group, as if the path groups are sorted in descending order by total transportation cost. In this example, that cost is $4,200. The next step includes selecting all path groups with a total transportation cost greater than or equal to $4,200. This includes the first 30,001 path groups from the TABLE 6. The number of path groups is higher than 30,000 because the 30,001$^{st}$ path group also has a total transportation cost of $4,200.

TABLE 6

| Path group ID | Total Transportation Cost |
|---|---|
| 1 | 7600 |
| 2 | 7590 |
| 3 | 7545 |
| . . . | |
| 29999 | 4260 |
| 30000 | 4200 |

TABLE 6-continued

| Path group ID | Total Transportation Cost |
|---|---|
| 30001 | 4200 |
| 30002 | 4175 |
| . . . | |
| 300000 | 600 |

In an embodiment, a node-skipping scenario is determined and validated for feasibility. As part of the feasibility check, a mode may be selected for the new lane given by the start and end sites and the path's product. The cost savings of the scenario is also computed. The node scenario feasibility checks may include the parameters from TABLE 7.

TABLE 7

| Check Name | Description | Condition to Pass |
|---|---|---|
| Has direct connection | Does any lane exist in the model for which the lane's source matches the start site, and the lane's destination matches the end site? (note this may not check for product matches) For example, if a path A-B-C-D-E is determined and a node skipping is required to be performed on the path A-B-C-D-E to directly ship from A-E, but lane A-E already exist in the model (for example, in transportation policies), then that isn't a node skipping opportunity because it is not a new lane when the model already has access to the lane A-E while running optimization | False |
| Has coordinates | Do both the start and end sites have coordinates? | True |
| Skippable sites | Are all sites that are skipped allowed to be skipped? The sites to exclude from scenario recommendation parameter defines which sites may not be skipped. | True |
| Scenario already tried | Has this node skipping scenario already been created (for a different path)? The node skipping scenario comparison is made over the path segment made by the start site, skipped sites, and end sites, as well as the path's product. | False |
| Geographic distance (also referred to as geo distance) | Was the geographic distance calculation between the start and end site successful, for example, is the distance greater than zero? | True |
| Mode selection | Was mode selection able to select a mode? | True |
| Lane exists | Does the new lane generated by the node skipping scenario already exist? The lane is defined by the start site, end site, path product, and selected mode. | False |
| Minimum cost savings | Is the cost saving less than the MinCostSaving? | False |
| Name of check | Description of check | Condition for Node Scenario to Pass the Check |

TABLE 7-continued

| Check Name | Description | Condition to Pass |
|---|---|---|
| New lane cost non-negative | Is the new lane cost, based on the estimated cost rate provided by the mode selection, less than 0? | False |
| Old path segment cost | Was the old path segment cost less than or equal to 0? | False |
| Cost saving threshold | Is the new lane cost lower than the old path segment cost by at least the NewCostRatioCutoff? (The NewCostRatioCutoff is a value <1 that is applied to the original cost rate) | True |
| Distance threshold | Is the new lane distance lower than the old path segment distance by at least the NewLaneDistance CutoffRatio? The NewLaneDistanceCutoffRatio is a value <1 that is applied to the original cost rate. | True |

A cost savings calculation may be utilized in the node-skipping scenario. Here, the mode selection process may provide the total cost of a business objective and the total transportation cost for a new lane. To find the costs for the original path segment, the sum the costs of each lane may be determined. The flow quantity used in this calculation may be an approximation of the flow quantity that will be affected by the addition of this new lane. Since not all paths are generated by Cost to Serve, and inspection of all paths may be expensive, it may not be possible to find the exact flow quantity that traverses the original path segment. Instead an approximation may be determined by finding the minimum flow quantity of the lanes in a path segment. This value will necessarily be greater than or equal to the actual flow quantity for the path segment. The cost savings for the node skipping scenario may be determined as the difference between the original path segment's total costs and the new lane's estimated total costs.

In an embodiment, the mode selection process provides an estimated transportation cost rate for the new lane, which is the basis for the total transportation cost for the new lane. The transportation cost rate is in cost per mile per unit. In some embodiments, the transportation cost rate may depend on a business objective basis which may be the user input. Therefore, in order to calculate the new lane's total transportation cost, the formula is the estimated transportation cost rate multiplied by the geographic distance of the new lane multiplied by flow quantity. Similarly, the cost of the path segment that is being replaced by the new lane is the sum of the lane transportation cost for each lane in the path segment. The flow quantity used in the cost-savings calculation approximates the flow quantity that may be affected by the addition of the new lane. In some embodiments, an approximation is calculated by finding the minimum flow quantity of the lanes in the path segment. This approximation value may be greater than or equal to the actual flow quantity for the path segment. The cost savings for the node-skipping scenario is the difference between the original path segment's total transportation cost and the new lane's estimated total transportation cost.

In an embodiment, mode switching is performed to determine new modes for existing lanes that are cost-effective. The methodology of mode switching searches through the existing lanes in the model that attempts to select a different mode that is cost-saving and validates that selection. If the new mode is feasible, the mode switching scenario is provided to the user in the output. In an embodiment, the lane selection for mode switching is calculated by ranking and filtering the lanes in the existing lanes of the model. For example, the existing lanes may be all existing lanes or a subset of existing lanes (forming a search space) in the model, and the ranking and filtering may reduce the search space. In some embodiments, an algorithm for lane selection may involve one or more of the following steps. For example, the algorithm may include one or more steps that include removing all the lanes where the destination is a customer, if "exclude customer facing lanes from mode switching" parameter is "true". For example, the algorithm may include a next step that includes determining if the total number of existing lanes (including the customer lanes) is less than MaxLaneNumWithoutFiltering. If this determination is true, in response to the determining step, all the candidate lanes not filtering from the previous step, are used. If the determination is not true, a ranking by transportation cost of the lane to select the lanes with the highest cost is used. Further, for example, the algorithm may include a next step that includes removing lanes in which the geographic distance, transportation cost rate, or total transportation cost is less than or equal to zero. Then, for example, the algorithm may include a next step that includes using the "SelectTopsCutoff" parameter similar to the node skipping path selection, to find the top percentile of lanes based on the transportation cost. These top percentile of lanes are then used.

In an embodiment, mode switching analysis is performed for computing the mode switching and lane selection. The mode switching analysis filters lanes if the geographic distance is less than the MinDistanceOfModeSwitching. For each lane selected, a mode selection scenario is performed and mode switching scenario is validated. The mode switching scenario is defined by the original lane, with the newly selected mode and cost rate and transportation time estimates. In an embodiment, TABLE 8 describes various conditions for performing mode switching scenario validation.

TABLE 8

| Check Name | Description | Condition to Pass |
|---|---|---|
| Estimated cost rate | Is the estimated cost rate provided by mode selection greater than the original lane's cost rate? Is the estimated cost rate less than or equal to zero? | False |
| Estimated cost rate threshold | Is the estimated cost rate lower than the original lane's cost rate by at least the NewCostRatioCutoff? The NewCostRatioCutoff is a value <1 that is applied to the original cost rate. | True |
| New lane exists | Does the lane define by the source, destination, product, and selected mode already exists? | False |

The mode switching scenario is defined by the original lane, with the newly selected mode and cost rate and transportation time estimates. The cost-savings calculation for the mode switching scenario includes the mode selection process providing an estimated transportation cost rate for the new lane. For example, when the business objective basis value is quantity-distance, the cost-savings is calculated by:

> Cost-savings=(original lane's transportation cost rate−new lane's estimated transportation cost rate)*geographic distance from source site to destination site*lane flow quantity The mode selection process provides the total cost of the business objective and the total transportation cost. The difference between the original lane's costs and the new lane's costs may represent the cost savings In general, the cost-savings may be calculated by, for example:

> Cost-savings=(original lane's transportation cost rate−new lane's estimated transportation cost rate)*business objective basis value In an embodiment, the mode selection is also defined as the process of choosing a mode for a new lane. The new lane can be based on an existing lane as in mode switching, or it can be a new lane as in node skipping. The new lane is partially defined already with a source, destination, and product. The mode selection chooses a mode and provides estimates for the total cost of the business objective, total transportation cost, transportation cost rate, and transportation time of the new lane.

FIG. 8 illustrates an example process 800 of a local mode search according to some embodiments. It should be noted that the steps of FIG. 8 are also applicable to embodiments that include a local lane search, as discussed below. In an embodiment, a local mode search is performed for a node-skipping scenario, that follows a search operation similar to the local lane search. At block 802, one or more local modes are determined via a local mode search. In some embodiments, a local mode is a mode used on adjacent lanes that share a source and/or destination with a given lane. For example, at block 802, one or more modes on lanes into and out of a source site or destination site are determined. In some embodiments, the local mode search is performed for the mode switching scenario as the first mode selection search. For example, the candidate modes for the local mode search includes all or a subset of the modes of the local lanes. In some embodiments, the local mode search selects the candidate mode with the lowest business objective cost (e.g., transportation cost or transportation+in-transit inventory cost), complying with check mode validation. For example, the transportation cost may be estimated using the global point estimate for cost, using a product-mode estimate when available, and/or the mode estimate. In some embodiments, the local mode search selects the candidate mode with the lowest product-mode average transportation cost rate (average cost and time) complying with check mode validation. At block 804, the selected mode is determined from the local mode(s). If a new mode is selected (i.e., a valid mode other than the original mode is found), the mode selection process is complete and ends at block 810, and the estimated transportation cost rate is found. The only remaining task is to estimate the transportation time. If no valid mode is found, at block 806, one or more non-local modes (modes in the model which are not local) are determined. In some embodiments, a non-local mode is a mode used on adjacent lanes that do not share a source and/or destination with a given lane. In some embodiments, the search selects the candidate mode with the lowest business objective cost (e.g., transportation cost or transportation+in-transit inventory cost), complying with check mode validation. For example, the transportation cost may be estimated using the global point estimate for cost, using a product-mode estimate when available, and/or the mode estimate. In some embodiments, the search selects the candidate mode with the lowest product-mode average transportation cost rate (average cost and time) complying with check mode validation. At block 808, the selected mode from the one or more non-local modes is determined. Then, a valid mode other than the original mode is found or no valid mode is found, meaning that the original mode may have been selected or the search may fail to select a mode. In either case, the process ends at block 810. If a new mode is selected (i.e., a valid mode other than the original mode is found), the mode selection process is complete and ends at block 810, and the estimated transportation cost rate is found. The only remaining task is to estimate the transportation time. If no valid mode is found, another search using process 800 may be performed.

In some embodiments, in a mode switching scenario, the original mode may be selected and in a node skipping scenario, the local mode search may fail to select a mode. In either case, the local mode search continues with the next searches including product-mode average search and mode average search.

In some embodiments, local lanes are determined from the existing lanes for which either the source of the new lane is the source or destination, or the destination of the new lane is the source or destination. In an embodiment, a local lane is determined by performing a local lane search which applies to the node-skipping scenario. In an embodiment, the local lane search finds (a) modes used on the lanes in cases where the new lane's source matches the source, and those modes are referred to as "start modes", (b) modes used on the lanes in cases where the new lane's destination matches the destination, and refers those modes as "end modes", and (c) intersection of start modes and end modes. From the list of local lanes, the first lane is chosen based on criteria including, but not limited to, the candidate lane's mode is one of the candidate modes, the candidate lane's product matches the product for the new lane, the candidate lane's transportation cost rate and geographic distance is greater than zero, and the candidate lane's mode passes the "check mode validation". For example, the chosen first lane may be the basis for mode selection the lane mode may be the selected mode for the new lane, and the transportation cost rate and transportation time rate may be used as the estimated transportation cost rate and estimated transportation time for the new lane. If a lane is chosen, the mode selection process may terminate; otherwise, the search may continue.

In another example, the lane associated with the lowest cost may be chosen rather than the first lane based on criteria including, but not limited to, the candidate lane's mode is one of the candidate modes, the candidate lane's product matches the product for the new lane, the candidate lane's transportation cost rate and geographic distance is greater than zero, and the candidate lane's mode passes the "check mode validation". For example, the chosen first lane may be the basis for mode selection the lane mode may be the selected mode for the new lane, and the transportation cost rate and transportation time rate may be used as the estimated transportation cost rate and estimated transportation time for the new lane. If a lane is chosen, the mode selection process may terminate; otherwise, the search may continue. In some embodiments, estimated transportation time for the new lane may be calculated. The product-mode average time may be used if it exists for the product mode pair. Otherwise, the mode average time rate may be used. The time rate may be multiplied by the new lane's geo distance to give the total estimated transportation time.

Node skipping scenarios may be grouped by Recommended_Source_Name, Recommended_Destination_Name, and/or Recommended_Mode. The group may be assigned a unique Master_Prescriptions_ID. For the details table, node skipping scenarios may be grouped by Recommended_Source_Name, Recommended_Destination_Name, Product_Name, and/or Recommended_Mode. The quantitative values in each scenario may be summed, the paths for each scenario may be grouped into a path set (which may be defined in the scgm_path_sets table), and the path segments may be grouped and sequenced into a lane set (which may be defined in the scgm_lane_sets table). Note there may be no Current_Mode defined for node skipping prescriptions; this column will have a Null value. In the summary table, each group of scenarios with the same Master_Prescriptions_ID may be reported on one line. The quantitative values may be summed and the products may be aggregated into a set (which may be defined in the scgm_path_sets table).

Mode switching scenarios may be generated by the lanes in the model. These scenarios may be grouped by Recommended_Source_Name, Recommended_Destination_Name, and/or Recommended_Mode. The group is assigned a unique Master_Prescriptions_ID. Each scenario may be entered as a unique line in the details table. There is no lane set associated with a Mode Switching Prescription; this may be denoted with a "−1" value in the Lane_Set_ID column. The path set may include all paths where the original lane (Recommended_Source_Name, Recommended_Destination_Name, Product_Name, Current_Mode) appears. In the summary table, the scenarios in each group may be aggregated and reported on one line. The quantitative values may be summed and the products may be aggregated into a set (which may be defined in the scgm_path_sets table).

In an embodiment, the product-mode average search may be performed to determine and select the mode, out of all existing modes, with the lowest product-mode average transportation cost and/or lowest product-mode median with outliers removed transportation cost, subject to the check mode validation. If a new mode is selected, the mode selection process is complete, and the estimated transportation cost rate is found. The only remaining task is to estimate the transportation time. If the product-mode average search fails to select a mode, the search continues.

In an embodiment, the mode average search and/or the mode with median with outliers removed search, is performed to determine and select the mode with lowest mode average transportation cost, subject to check mode validation. If a new mode is selected, the mode selection process is complete, and the estimated transportation cost rate is found. The only remaining task is to estimate the transportation time. If the mode average search fails to select a mode, then there is no other search to be performed and mode selection may not select any mode.

In an embodiment, the estimated transportation time for the new lane is calculated if a mode is selected. The product-mode average time rate (average cost and time) is used if it exists for the product mode pair, otherwise, the mode average time rate is used. The time rate is multiplied by the new lane's geographic distance to calculate the total estimated transportation time.

In some embodiments, the total transportation cost may be calculated by using the estimated transportation cost rate and multiplying by the new lane's basis. For instance if the basis is Quantity-Distance, the total transportation cost=estimated transportation cost rate*new lane flow quantity*new lane geo distance. In some embodiments, the in-transit inventory cost may be calculated by source-product's in-transit inventory unit cost*new lane flow quantity*new lane estimated transportation time. In some embodiments, the total cost of the business objective may be calculated using the total transportation cost and in-transit inventory cost as defined in the business objective.

In an embodiment, the check mode validation may be used to check candidate mode in each of the local lane searches, local mode search, product-mode average search, product-mode median with outliers removed search, mode average search, and/or mode median with outliers removed search. The check mode validation includes determining of the invalid mode switch, mode distance thresholds, mode type, and shipment frequency constraints. In an embodiment, the candidate mode may not be an invalid mode switch as defined by the invalid mode switches table. Under check mode validation, for node-skipping, the candidate mode may not be an invalid mode switch for any of the modes in the original path segment. In mode switching, the candidate mode may not be an invalid mode switch for the original mode. In an embodiment, as part of the check mode validation, the mode distance thresholds define lower and upper bounds of the candidate mode's distance thresholds within which the new lane's geographic distance fall. The mode type is associated with the type of transportation mode including the source and destination of the new lane of the candidate mode's type, for example, the candidate mode type may be an air or ocean type; both the source and destination of the new lane may be required to support the candidate's mode type. For example, if the mode is air, the new lane geographic distance may be required to be greater than a MinAirModeDistance value. The shipment frequency constraints may be provided by the shipment frequency table. The shipment frequency constraints satisfy a shipment size estimate for the new lane provided either by the candidate lane as in the local lane search, the product-mode average shipment size, product-mode median with outliers removed shipment size, the mode average shipment size, or the mode median with outliers removed shipment size. The shipment frequency constraints are checked against only one shipment size. If the constraint is not satisfied for the shipment size, or if no shipment size exists, this check fails. For node-skipping, the shipment frequency constraint may be used on the minimum flow lane which is the lane in the original path segment that supplies the flow quantity for the scenario. For the mode switching, the shipment frequency constraints are used on the original lane.

FIG. 3 is a hypothetical supply chain network in which node "c" at block 302 uses transportation mode "model" to reach node "A" at block 304. A node "d" at block 318 uses "mode3" to transport "Product-1" to A at block 304. Node A uses "mode3" for transportation to "k" at block 320, uses "mode3" for transportation of "Product-1" to node "e" at block 322. Node A at block 304 uses "mode2" to move "Product-1" to node B at block 324 via nodes X at block 306, Y at block 308, and Z at block 310. As shown, "mode7" transports "Product-1" from Z at block 310 to B at block 324. Node B at block 324 also receives items from node "f" at block 312 via "mode3," and sends items via "mode5" to node "g" at block 314 and via "mode6" to node "h" at block 316. Notably, the path from node A at block 304 to node B at block 324 has three intervening nodes X at block 306, Y at block 308, and Z at block 310. Therefore, analysis of the supply chain data assess whether nodes X, Y, and Z may be skipped by using a different mode to move "Product-1" directly from A to B. In some embodiments, inspection of a lane or path from A at block 304 to B at block 324 can involve querying and calculating estimates of costs, time, or other variables based on local data, global product-mode data, or global mode data alone. After these queries, validation of the lane or path can comprise distance checking, port checking, cost-saving checking, and route checking, against absolute data like the database 204, or using threshold values such as whether the calculated cost of the new direct lane or path is within a threshold difference of the existing cost of using nodes X, Y, Z for the path from A to B.

In some embodiments, mode switching may include suggesting new modes for existing lanes that are cost-effective and rely on mode selection. The mode switching searches through the existing lanes in the supply chain model selects a different mode that may result in cost savings and validates the selection. If the new mode is feasible, the mode switching scenario may be provided to the user in the output. An example of mode switching includes the use of a less costly (i.e., less expensive) transportation mode, such as ocean transportation rather than air transportation, changing from parcel to truckload, using less than carload or truckload shipments compared to full railcars or trucks, etc. However, for example, a less costly transportation mode that may be used is a full truck load rather than a partially full truckload, as the full truck load may be more efficient. In general, surface transportation such as using ocean vessels always is less costly per trip than air transportation. In some embodiments, for mode switching analysis, scenario prescriptions unit 108 may be programmed to consider shipment consolidation and changing the frequency of shipments to measure the impact on cost.

In some embodiments, volume consolidation refers to a technique to save on cost by using available consolidation savings. The volume consolidation may determine where savings opportunities exist, and which have the greatest impact. For example, the volume consolidation may perform (a) identification of sites with multi-product sources or multi-product destinations; (b) scanning the top paths that are ranked by the transportation cost along with all possible subsets of the path; and/or (c) identification of a path segment that is shared by many other paths of the same product which indicates that the actual flow of this path segment is the lowest flow quantity of the lane along the path segment. An example of volume consolidation is suggesting that some commodities, goods, assemblies, or products should be transported together to achieve a lower transportation cost. For example, some lanes may geographically overlap and/or involve subsets of the same nodes, yet have different modes (e.g., different modes to transport different items) and items specified in the input model. In an embodiment, scenario prescriptions unit 108 may further be programmed to identify overlapping or common segments of multiple lanes in the model for which multiple different modes are being used to ship different products, commodities, or goods. In response, scenario prescriptions unit 108 may be programmed to generate a prescription in AI prescriptions data asset 110 to implement volume consolidation to use the least-cost mode of the different modes.

For example, volume consolidation scenarios may include where multiple paths share a common sequence of sites. Each of these scenarios may be assigned a unique Master_Prescriptions_ID. Each path and each lane within the common sequence of sites for the path may be reported on one line within a details table. Each of these lines may have the same path set id, for the path set will consist of all paths in the scenario. Because the lanes are enumerated in their own line, there may not be a lane set associated with a Volume Consolidation Prescription; thus, this may be denoted with a "−1" value in the Lane_Set_ID column. In a summary table, each scenario may be reported on one line. The cost values from the details table may be summed, the weight, volume and quantity columns may be summed over distinct products, and the products may be aggregated into a set (which may be defined in the scgm_path_sets table).

FIG. 4A illustrates an example supply chain network with a volume consolidation scenario. A hypothetical network 400 may be defined in database 102 using records for two paths denoted Path-1 and Path-2. Each of the Path-1 and Path-2 includes a plurality of lanes that connect a central distribution center (CDC) shown to 402 to other DCs denoted DC1 shown as 404, DC2 shown as 406, DC3 shown as 408. Each lane is defined by a path identifier like P1, or P2, a volume value like 100, or 200, and a mode value like LTL and FTL representing less than truckload and full truckload respectively. In some embodiments, path identifier P1 may refer to a path. In some embodiments, path identifier P1 may refer to a product or finished good itself. Based on the volume value and mode value, scenario prescriptions unit 108 may be programmed to calculate a cost for each lane. In the example of FIG. 4A, each of the three (3) lanes between CDC and DC1, DC1 and DC2, and DC2 and DC3 have a cost on P1 (e.g., product P1) of P1/200/LTL and a cost on P2 (e.g., product P1) of P2/100/FTL. In some embodiments, P1 exclusively uses the mode LTL and P2 exclusively uses FTL as shown in FIG. 4A. Mode switching analysis, as well as volume consolidation analysis, may be programmed to calculate a difference of the existing cost on each lane, of P1/200/LTL, compared to the cost for the same volume using the FTL mode, or P1/200/FTL. If the difference is greater than a specified cost threshold, which can be stored in configuration data, then switching modes to FTL is viable for all lanes of path Path-1.

FIG. 4B shows an example of cost-saving calculation, according to one embodiment. FIG. 4B illustrates an example supply chain network with a volume and transportation consolidation scenario. A hypothetical network 412 may be defined in database 102 using records for two paths denoted Path-1 and Path-2. Each of the Path-1 and Path-2 includes a plurality of lanes that connect manufacturing (MFG) 414 site to various distribution centers. In the example shown by FIG. 4B, MFG 414 is connected to DC1 416, DC1 416 is connected to DC2 418, and DC2 418 is connected to DC8 420. Each lane may be defined by a product P1 or P2, a volume value referring to a number of commodities or products (for example, 70 for a product P1, 100 for a product P2), and/or a mode value (for example, LTL ("less than truckload) or FTL ("full truckload"). Based on the volume value and mode value, scenario prescriptions unit 108 may be programmed to calculate a cost for each lane. In the example of FIG. 4B, the lanes between MFG 414 and DC1 416, and DC2 418 and DC8 420, have a cost on P1 of P1/70/LTL. The lane between DC1 416 and DC2 418 has a cost on P1 of P1/70/FTL. In the example of FIG. 4B, the lane between MFG 414 and DC1 416, and DC2 418 and DC8 420, have a cost on P2 of P2/100/FTL. The lane between DC1 416 and DC2 418 has a cost on P2 of P2/100/Air. In some embodiments, a path may exclusively use a single mode, or a path may use multiple modes. Mode switching analysis, as well as volume consolidation analysis may be programmed to calculate a difference between the existing cost on each lane using LTL mode (for example, P1/70/LTL) and cost on each lane for the same volume using the FTL mode (for example, P1/70/FTL). If the difference is greater than a specified cost threshold, which can be stored in configuration data, then mode may be switched. For example, in FIG. 4B, mode may be switched to FTL or to LTL for all lanes of path Path-1 depending on that calculated difference. For example, after the difference calculation, as shown in FIG. 4B, product P1 may use FTL 424 between the MFG 414 and DC1 416, product P2 may use FTL 426 between the DC1 416 and DC2 418 and product P1 may use FTL 428 between DC2 418 and DC8 420. In this example, the given path segment with actual flow being "70" as P1 when the product P1 is shared by many other paths for the same products, multi-products flow, and the transportation mode may be considered, as referred from FIG. 4B, then the cost saving may be calculated as:

$$\text{Cost Saving}=(\text{Cost } P1/70/LTL-\text{Cost } P1/70/FTL)//\text{ for }$$
$$MFG-DC1+(\text{Cost } P2/100/Air-\text{Cost } P2/100/$$
$$FTL)//\text{ for } DC1-DC2+(\text{Cost } P1/70/LTL-\text{Cost }$$
$$P1/70/FTL)//\text{ for } DC2-DC8$$

In some embodiments, based on customizable criteria, a volume consolidation scenario may be dropped if the cost saving is below a predetermined threshold and/or determined as not significant. In some embodiments, path overlap checking can help remove scenarios that have a path segment that is a subset of the path segment of other scenarios. In some embodiments, scenarios may be ranked by total cost savings and may be displayed.

FIG. 9 illustrates an example process 900 for volume consolidation according to some embodiments. At block 902, sites of multiple source and multiple destination products are searched for. In some embodiments, the search uses supply chain mode and path data. At block 904, path segments shipping multiple products are searched for. At block 906, the path flow for each product is determined by checking flow data. In some embodiments, all flow data is checked. At block 908, a cost-saving mode for one or more shared lanes that include each product is determined. At block 910, cost saving by mode switching is estimated. In some embodiments, a mode switching test is performed to provide this estimation. At block 912, volume consolidation scenarios are determined and validated. At block 914, volume consolidation scenarios are filtered. In some embodiments, the filtering may include filtering by path overlap checking. At block 916, the filtered volume consolidation scenarios may be ranked. In some embodiments, the ranking is by total cost savings. At block 918, the ranked volume consolidation scenarios may be validated.

In some embodiments, the scenario prescriptions unit 108 may be programmed to generate one or more visualizations of updated network models based on the cost computed for the one or more scenario prescriptions, associated with the supply chain network, in which the prescriptions may be implemented. In some embodiments, the scenario prescription unit 108 may cause displaying the one or more visualizations of the updated network models of the supply chain network.

Figure 5A:
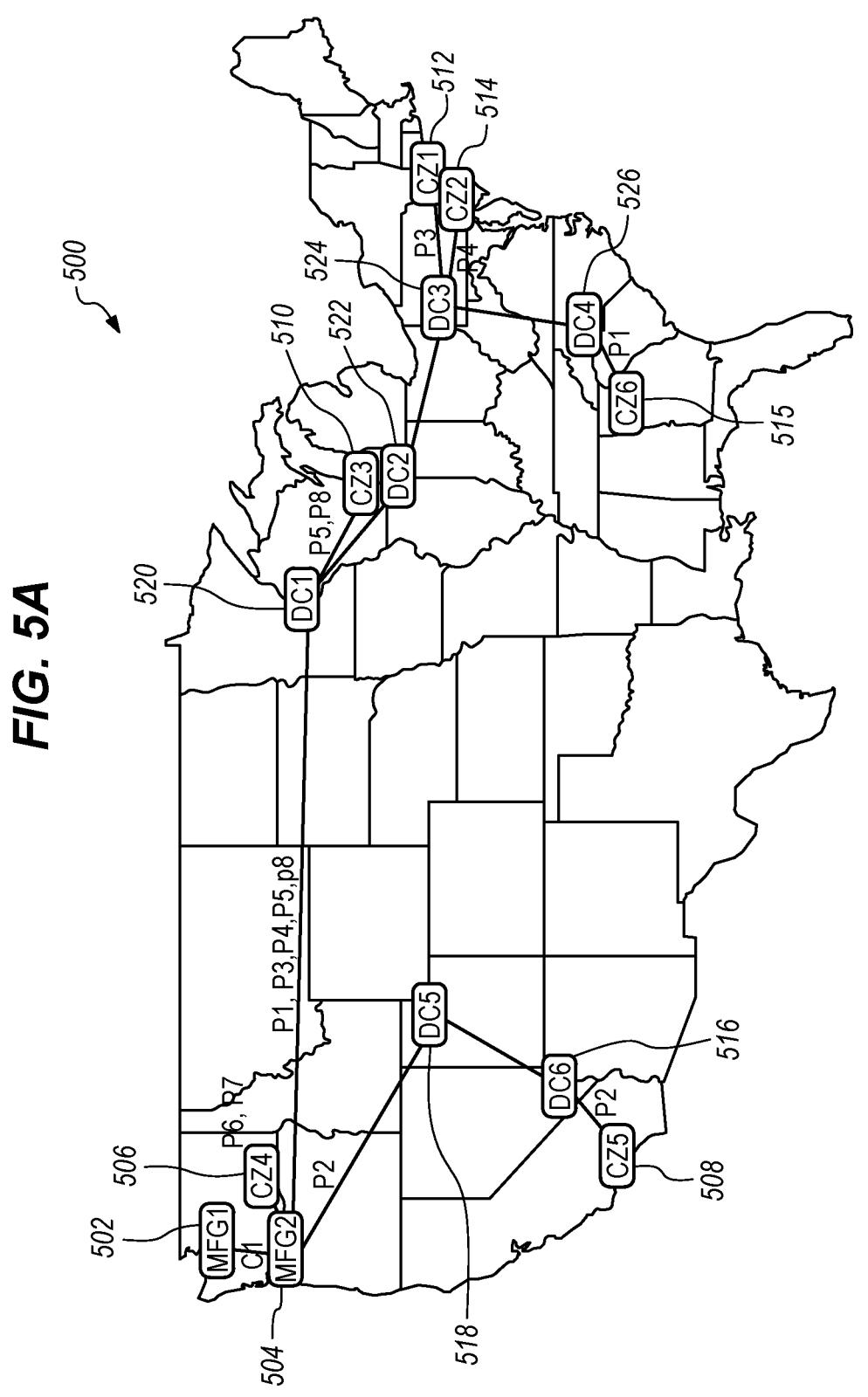
FIG. 5D illustrates an example supply chain network and a series of prescriptions that may be automatically applied to the network based on applying the techniques of the present disclosure.
Figure 5B:
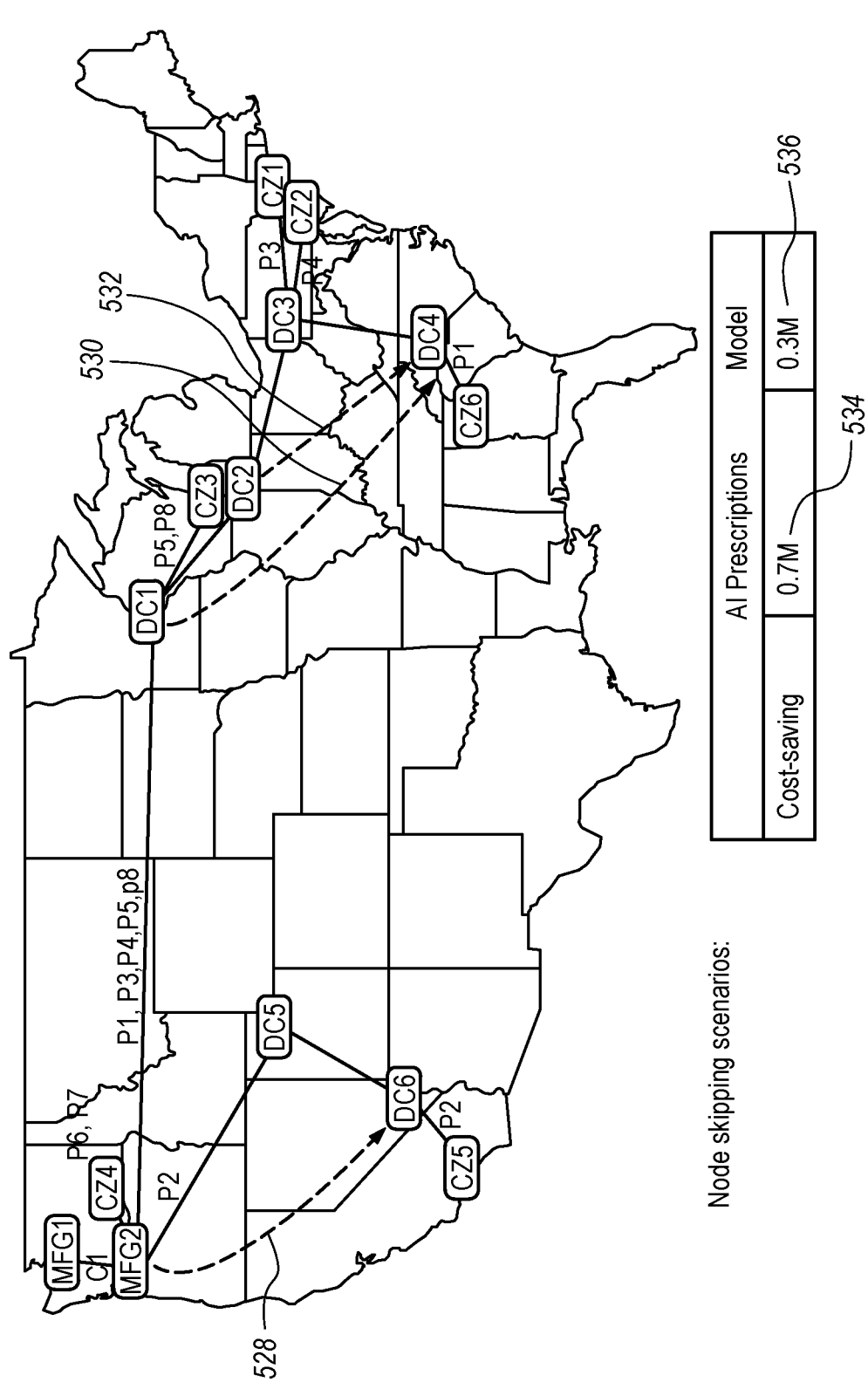
Figure 5C:
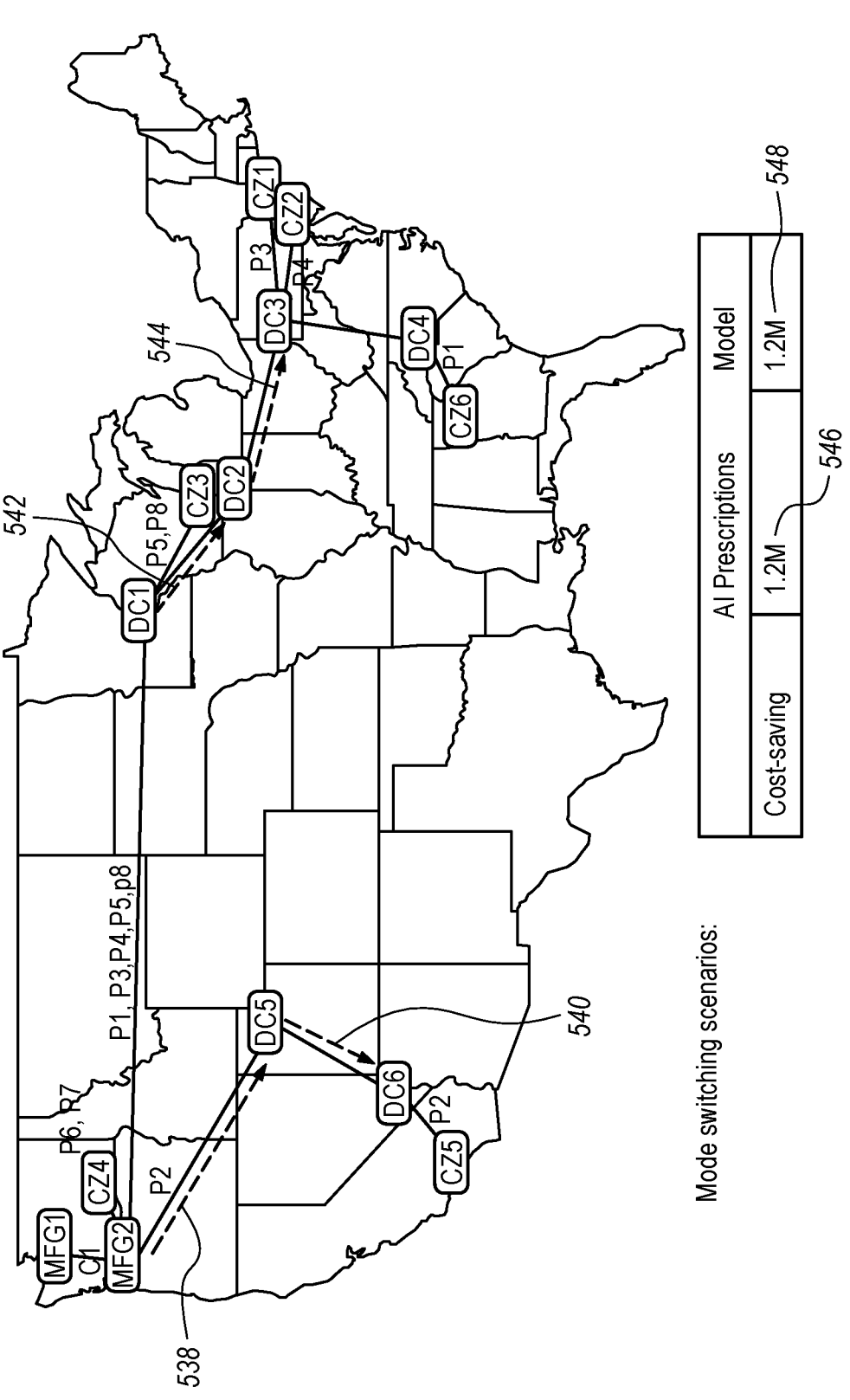
Figure 5D:
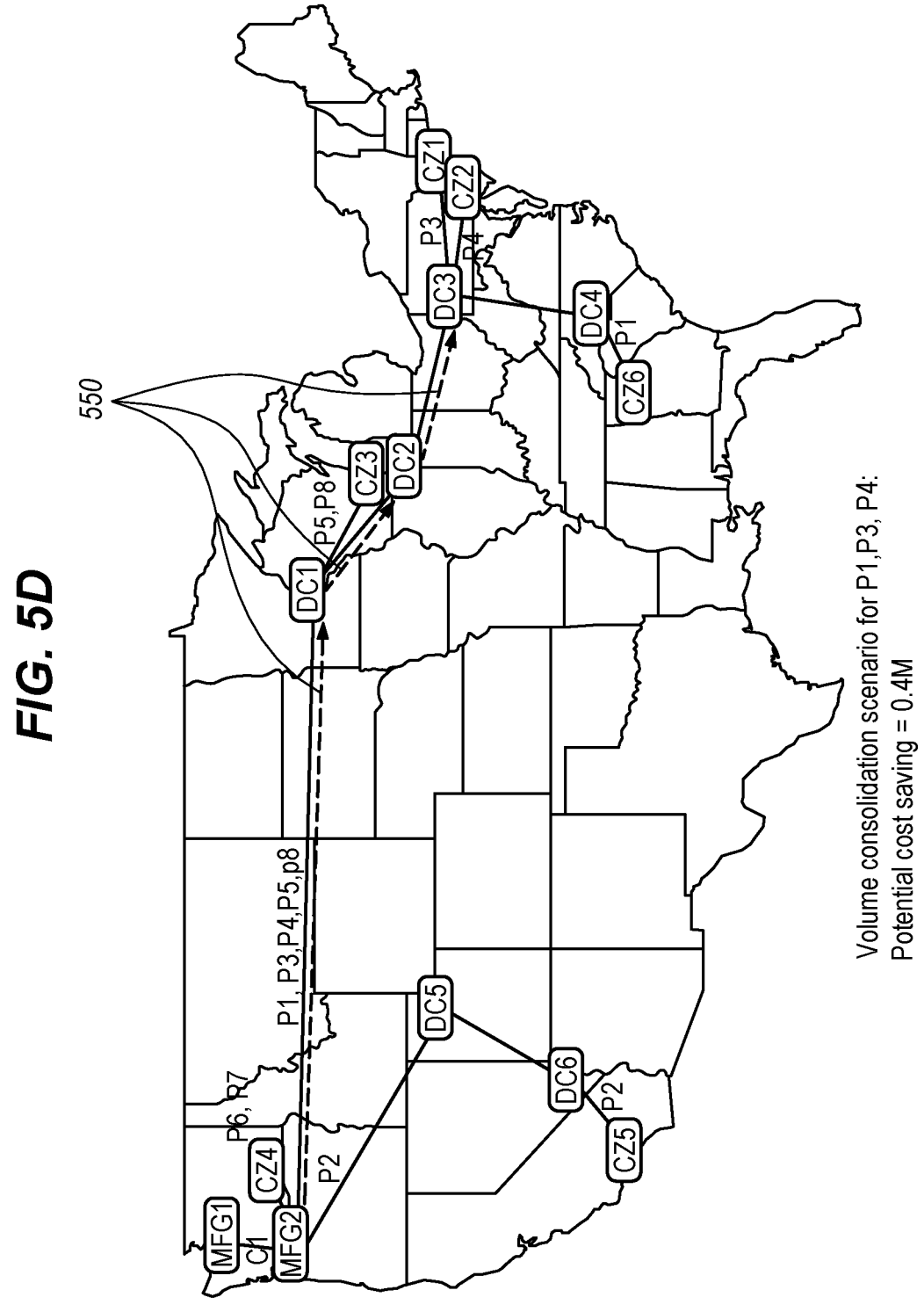

FIG. 5A illustrates an example of a baseline supply chain network and each of FIG. 5B, FIG. 5C, FIG. 5D illustrates an example prescription that can be automatically applied to the network based on applying the techniques of the present disclosure. Referring first to FIG. 5A, in an embodiment, an example supply chain network comprises a plurality of nodes in different locations in the continental United States of America, which is schematically represented using a line map showing state boundaries. The network comprises manufacturing sites MFG1 shown as 502, MFG2 shown as 504 connected via lane C1, a plurality of distribution centers denoted DC1 shown as 520, DC2 shown as 522, DC3 shown as 524, DC4 shown as 526, DC5 shown as 508, DC6 shown as 516, and customer zones denoted CZ1 shown as 512, CZ2 shown as 514, CZ3 shown as 510, CZ4 shown as 506, CZ5 shown as 508, CZ6 shown as 515. The network comprises a plurality of products denoted P1, P2, P3, etc., with some paths comprising a plurality of lanes or segments.

FIG. 5B illustrates the supply chain network of FIG. 5A in which node-skipping scenarios have been applied to define new paths from MFG2 to DC6 shown with dotted lines 528, from DC1 to DC4 shown with dotted lines 530, and from DC2 to DC4 shown with dotted lines 532. In this example, the application of the AI-based model (for example, supply chain models), including the selection and application of a given prescription as described herein, could result in cost savings of $0.7M at 534 compared to an original forecast from the baseline model of savings of $0.3M at 536.

FIG. 5C illustrates the supply chain network of FIG. 5A in which mode switching scenarios have been applied to define new paths and/or lanes from MFG2 to DC5 shown with dotted line 538 and then to DC6 shown with dotted line 540, and from DC1 to DC2 to DC3 shown with dotted lines 542 and 544. In this example, the application of an AI-based model, including the selection and application of a given prescription as described herein, could result in cost savings of $1.2M at 546 compared to an original forecast from the baseline model of savings of $1.2M at 548.

FIG. 5D illustrates the supply chain network of FIG. 5A in which a volume consolidation scenario has been applied to paths or products P1, P3, P4, to define a new path from MFG2 to DC1, DC2, DC3 shown with dotted lines 550. In this example, the application of an AI-based model as described herein could result in cost savings of $0.4M.

Figure 6A:
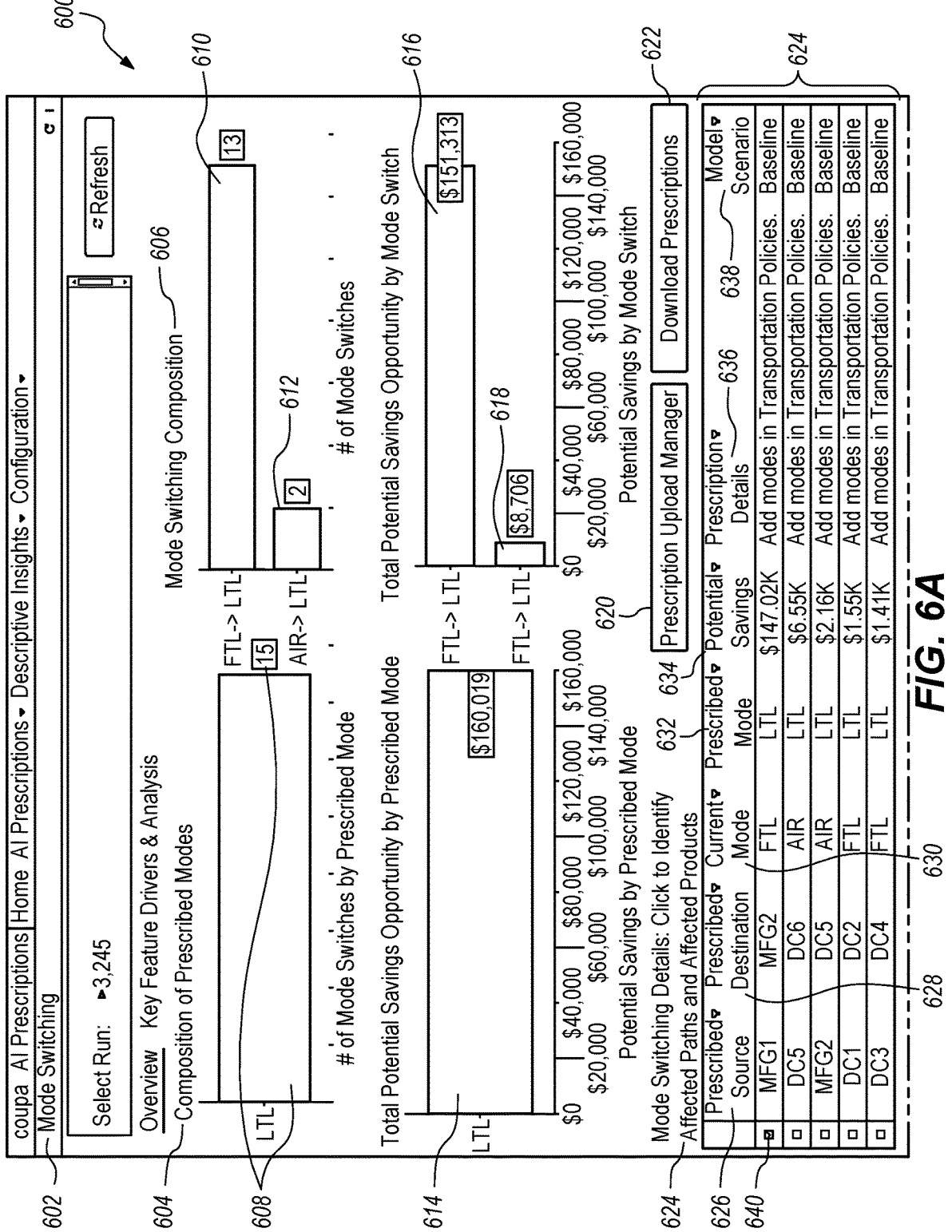
FIG. 6C illustrates a computer display device that has rendered and displayed a graphical user interface with visual panels, widgets, and displays that could be programmed in an embodiment.
Figure 6A:
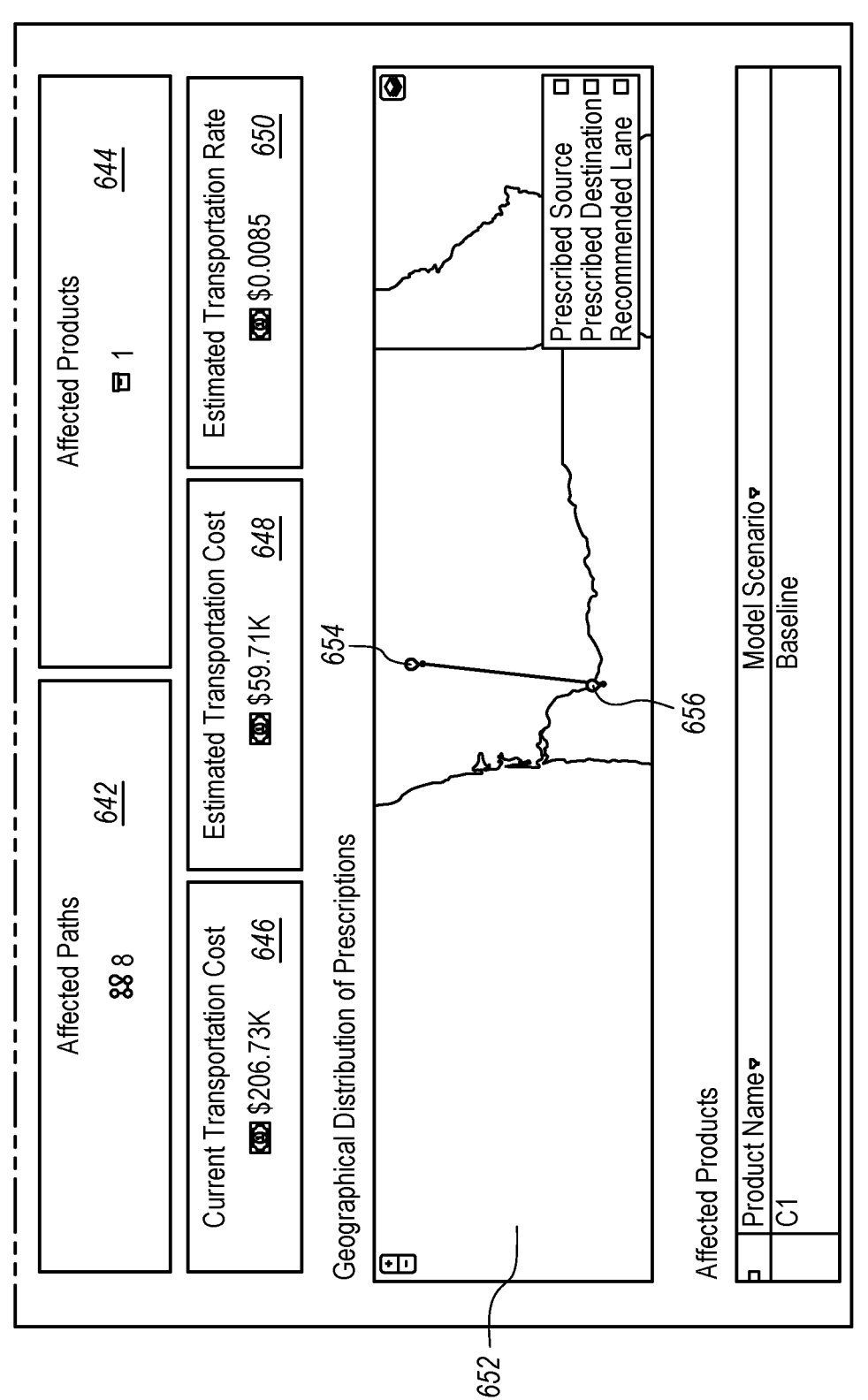
Figure 6B:
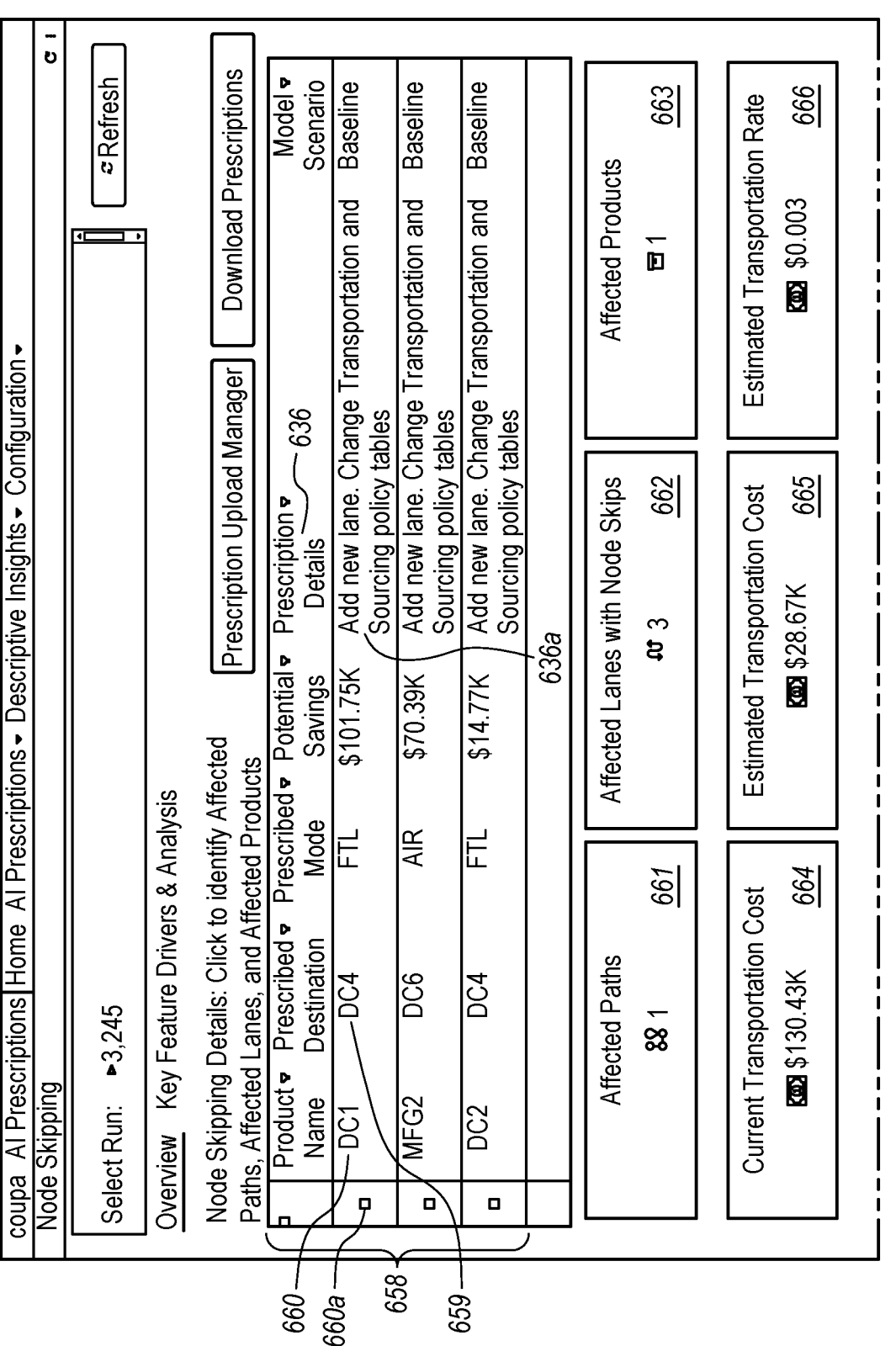
Figure 6B:
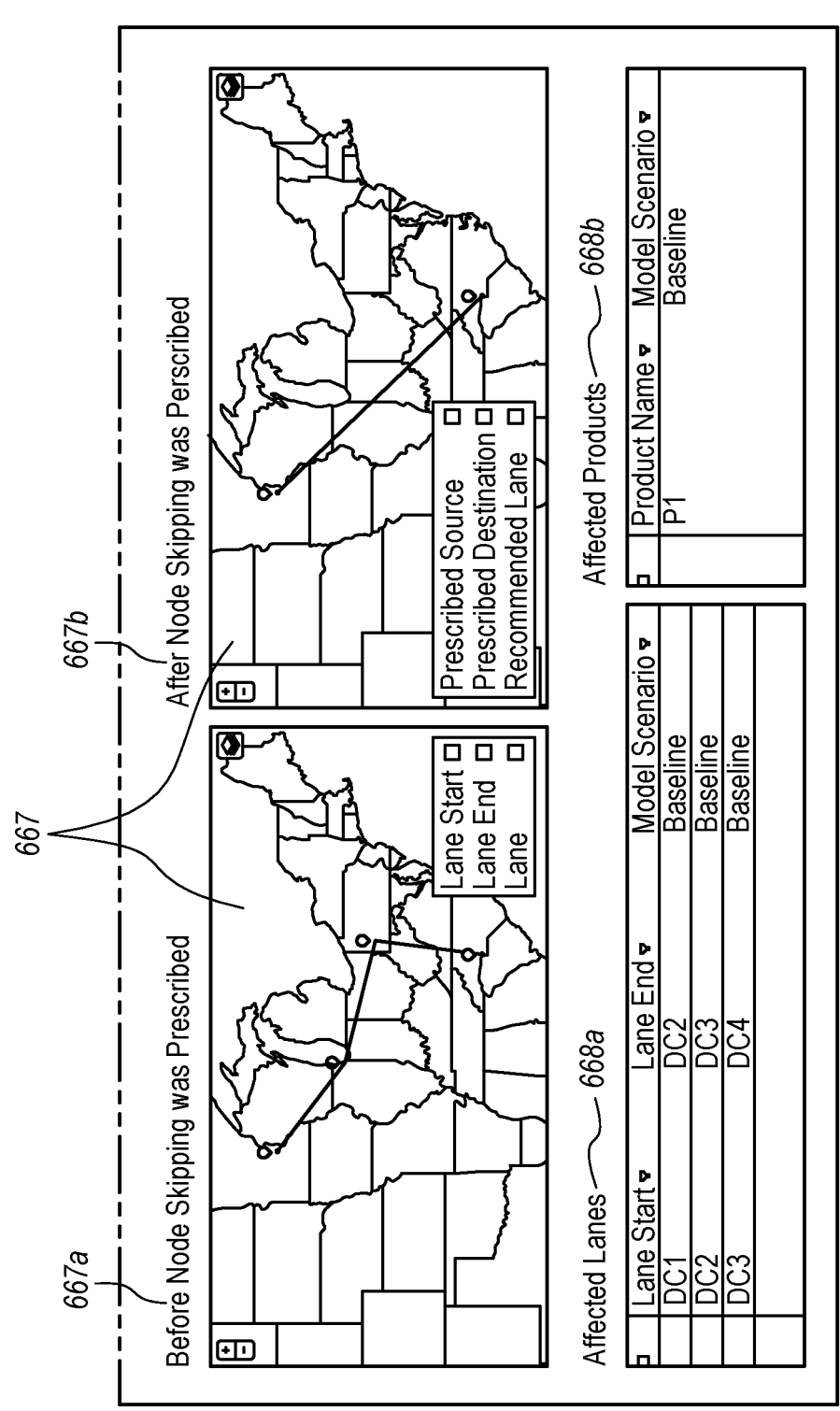
Figure 6C:
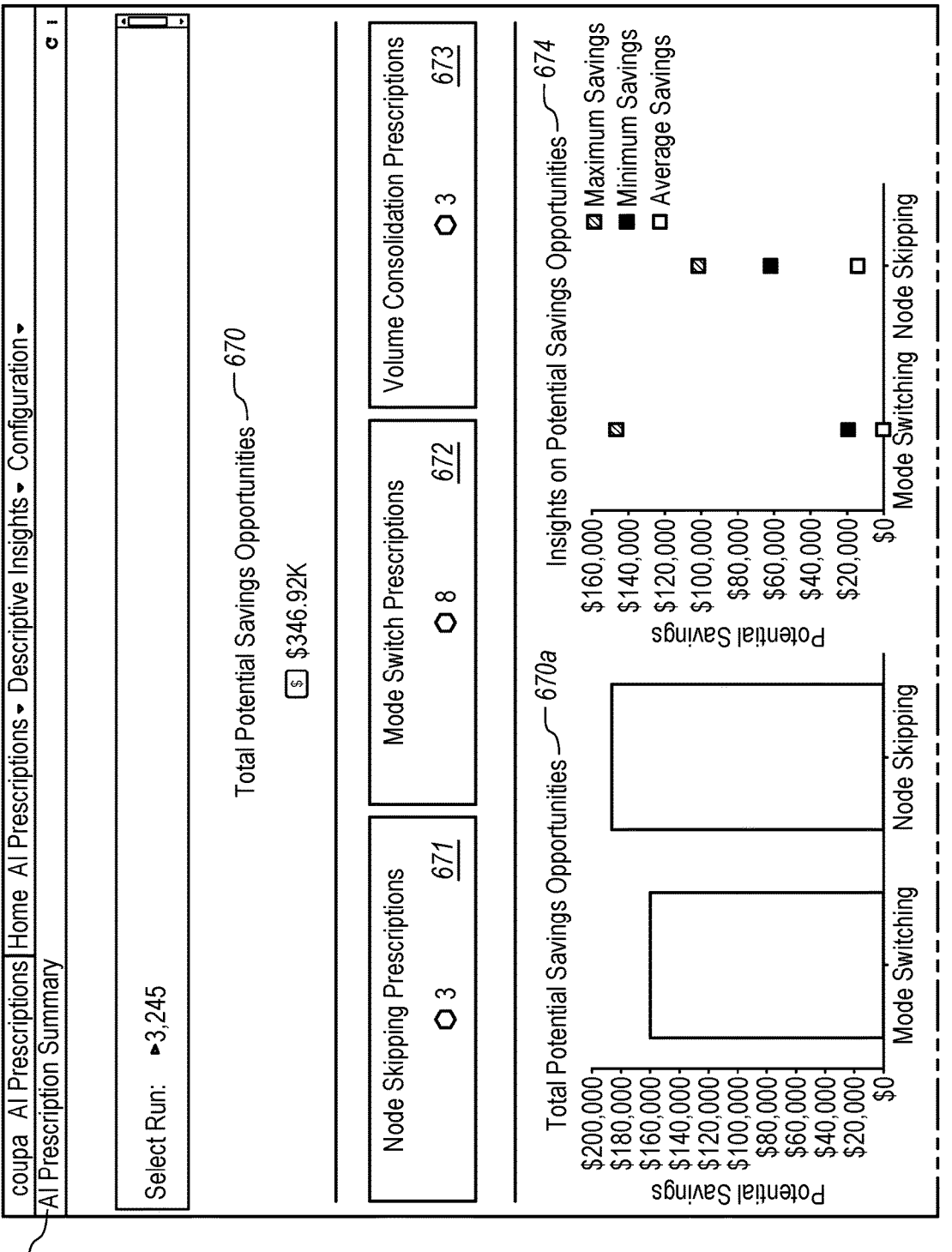

Each of FIG. 6A, FIG. 6B, FIG. 6C illustrates a computer display device that has rendered and displayed a graphical user interface with visual panels, widgets, and displays that may be programmed in an embodiment. In an embodiment, FIG. 6A includes a visual display of mode switching scenarios, FIG. 6B comprises a visual display of node-skipping scenarios and FIG. 6C includes a visual display of a prescription's summary based on the AI models herein. Each of FIG. 6A, FIG. 6B, FIG. 6C includes a scrollable visual window for a graphical user interface and, due to size and complexity, is presented in multiple sheets or views. Other embodiments could include more or less data and/or GUI widgets and could fit in windows of different sizes with or without scrolling.

Referring first to FIG. 6A, first sheet or view, in an embodiment, the GUI 600 that is shown in the drawing figure can be generated under program control after executing an inference stage of the AI models described herein against a baseline model 206 and presents an overview of prescriptions for mode switching 602 as applied to the baseline model 206. The GUI 600 can comprise a plurality of graphical bar charts (604, 606) that visually indicate the magnitude of counts and/or values associated with cost savings. For example, a first bar chart denoted "Composition of Prescribed Modes" with 604 includes a single bar 608 since all mode switches involve a prescribed mode of less-than-truckload (LTL) ground freight transportation with a total of 15 mode switches having been prescribed. A second bar chart denoted "Mode Switching Comparison" 606 comprises two bars 610, 612 that visually and proportionally represent 13 prescriptions to switch from full truckload (FTL) mode to LTL as shown in bar 610, and two prescriptions to switch from air transportation to LTL as shown in 612. Third and fourth bar charts denoted "Total Potential Savings Opportunity by Prescribed Mode" shown with numeral 614 and "Total Potential Savings Opportunity by Mode Switch" shown with numerals 616, 618 correspond in format to the first and second bar charts (610 and 612), but present dollar values representing savings associated with the same mode switch prescriptions.

In an embodiment, the GUI 600 of FIG. 6A may be programmed to include graphical buttons labeled "Prescription Upload Manager" denoted with 620 and "Download Prescriptions" denoted with 622 which, when selected, enable uploading or downloading prescriptions to or from one or more specified supply chain nodes. Thus, the system may be programmed to dispatch and install digital data representing the mode switching prescriptions at affected paths and/or nodes, to trigger actual changes at those nodes or paths to implement the prescriptions.

The GUI 600 of FIG. 6A may be programmed to display a table of affected paths and affected products denoted with 624 that detail what changes are prescribed for implementation at different nodes. In one embodiment, the table 624 includes a plurality of rows, each row corresponding to one prescription. Each prescription and row is defined by values for a plurality of column attributes including prescribed source 626, prescribed destination 628, current mode 630, prescribed mode 632, potential savings 634, prescription details 636, and model scenario 638. In an embodiment, collectively the values of these column attributes define a particular prescription that can be applied at a particular source node in relation to other nodes. In an embodiment, the attributes have the following meanings, using the values for the first row of the table as a representative row. In an embodiment, prescribed source 626 refers to the starting node involved in the mode switching prescription that the row represents. The prescribed destination 628 refers to the destination node involved in the mode switching prescription that the row represents. The current mode 630 refers to the mode of transportation that is presently used in the supply chain network for moving goods from the source to the destination. The prescribed mode 632 refers to the mode of transportation that the prescription recommends switching to. The potential savings 634 refers to the amount of potential transportation cost-savings that may be achieved with the mode switch. The prescription details 636 refers to a description of how to implement the prescription. For example, "Add modes in Transportation Policies" may specify the requirement to update a database table at the specified source nodes, and/or in the model, to add the prescribed mode as a transportation policy for goods departing the specified source nodes. In some embodiments, uploading a prescription, which has been selected via a checkbox widget 640 in the row representing a prescription, causes automatic transmission of a database update, notification, message for a message bus, or other change in the data of a node as required to implement the selected prescription and cause the prescribed change for all future shipments from that node. The model scenario 638 refers to the name of the supply chain model representing a supply chain network that the AI algorithms evaluated to form the prescription.

Referring now to the second sheet or view of FIG. 6A, the GUI of FIG. 6A can display one or more widgets, panels, boxes, or other graphical elements showing a count of affected paths 642, a count of affected products 644, a current transportation cost value 646 associated with all such paths, an estimated transportation cost 648 associated with applying the mode switching prescriptions in the network, and an estimated transportation rate 650 per mile, kilometer, or another unit of distance. In an embodiment, the GUI 600 also can identify products by product name that would be affected by the mode switch.

The GUI 600 also can be programmed to display a visual map 652 showing geographical points 654, 656 at which the mode switch would occur. In the example of FIG. 6A, the visual map 652 applies to the first row of the table because a checkbox widget 640 adjacent to the first row, near the prescribed source 626 column, has been checked in response to user input. In an embodiment, with the checking multiple checkboxes of two or more rows can cause the system to automatically generate and display a visual map of all points involved in the selected mode switches.

Referring now to FIG. 6B, first sheet or view, in an embodiment, the GUI that is shown in the drawing figure can be generated under program control after executing an inference stage of the AI models described herein against a baseline model and presents an overview of prescriptions for node skipping as applied to the baseline model. The GUI of FIG. 6B may have the same general format as FIG. 6A, with data values that vary based on the difference between node skipping as compared to mode switching. For example, each row, labeled collectively as 658 of the table in FIG. 6B can specify a starting node and destination node, like DC1 659 and DC4 660 for the first row, which implicitly skips a node that otherwise had been included in the baseline model. The prescription details 636 values of rows in the table can specify a different form of implementation, such as "Add new lane . . . Change Transportation and Sourcing policy tables," 636a which represent database changes to make in the supply chain models and/or at the specified nodes for local implementation.

In an embodiment, the GUI of FIG. 6B also can display one or more widgets, panels, boxes, or other graphical elements showing a count of affected paths 661, a count of affected lanes with node skips 662, a count of affected products 663, a current transportation cost 664 value associated with all such paths, an estimated transportation cost 665 associated with applying the mode switching prescriptions in the network, and an estimated transportation rate 666 per mile, kilometer, or another unit of distance.

Referring now to the second sheet or view of FIG. 6B, the GUI also can be programmed to display a visual map 667 showing geographical points before 667a and after 667b implementing a prescribed node skip. In the example of FIG. 6B, the visual map 667 applies to the first row of the table because a checkbox widget 660a adjacent to the first row, near the prescribed source (product name) column, has been checked in response to user input. Checking multiple checkboxes of two or more rows can cause the system to automatically generate and display a visual map of all points involved in the selected mode switches.

In an embodiment, the GUI also can identify affected lanes 668a and affected products 668b by product name, for items that would be affected by the prescribed node skipping.

Referring now to FIG. 6C, in an embodiment, the system may be programmed to generate and visually display a summary 669 of all prescriptions that the AI models have recommended. In the example of FIG. 6C, first sheet or view, a GUI can be programmed to display a value for total potential savings opportunities 670 arising from the prescriptions, a count of total node skipping prescriptions 671 that the AI models have recommended in a particular run of the models, a count of total mode switch prescriptions 672 that the AI models have recommended, and a count of total volume consolidation prescriptions 673 that the AI models have recommended. The GUI can include a bar chart 670*a* with a plurality of bars representing projected cost savings values attributable to mode switching, node skipping, and/or volume consolidation. The GUI can include a scatter plot 674 with icons representing estimates of maximum savings, minimum savings, and average savings for mode switching, node skipping, and/or volume consolidation.

Referring now to the second sheet or view of FIG. 6C, in an embodiment, the GUI can be programmed to display a table 676 of top scenario prescriptions, such as the top seven to ten prescriptions that the AI models recommended, ordered based on potential savings with the greatest savings being first. Further, the GUI can be programmed to display a bar chart 677 showing the top network-level factors increasing and decreasing costs. In the example, distribution center DC5 labeled as 678 is associated with the highest increase in costs for a path since the bar in the bar graph for DC5 is the longest in the rightward direction. In contrast, the FTL 679 transportation mode is associated with a decrease in cost since its bar extends leftward.

Embodiments can be useful and beneficial to address cost workflow that reduces costs in the network. Embodiments may be programmed to identify the cost drivers of a path.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
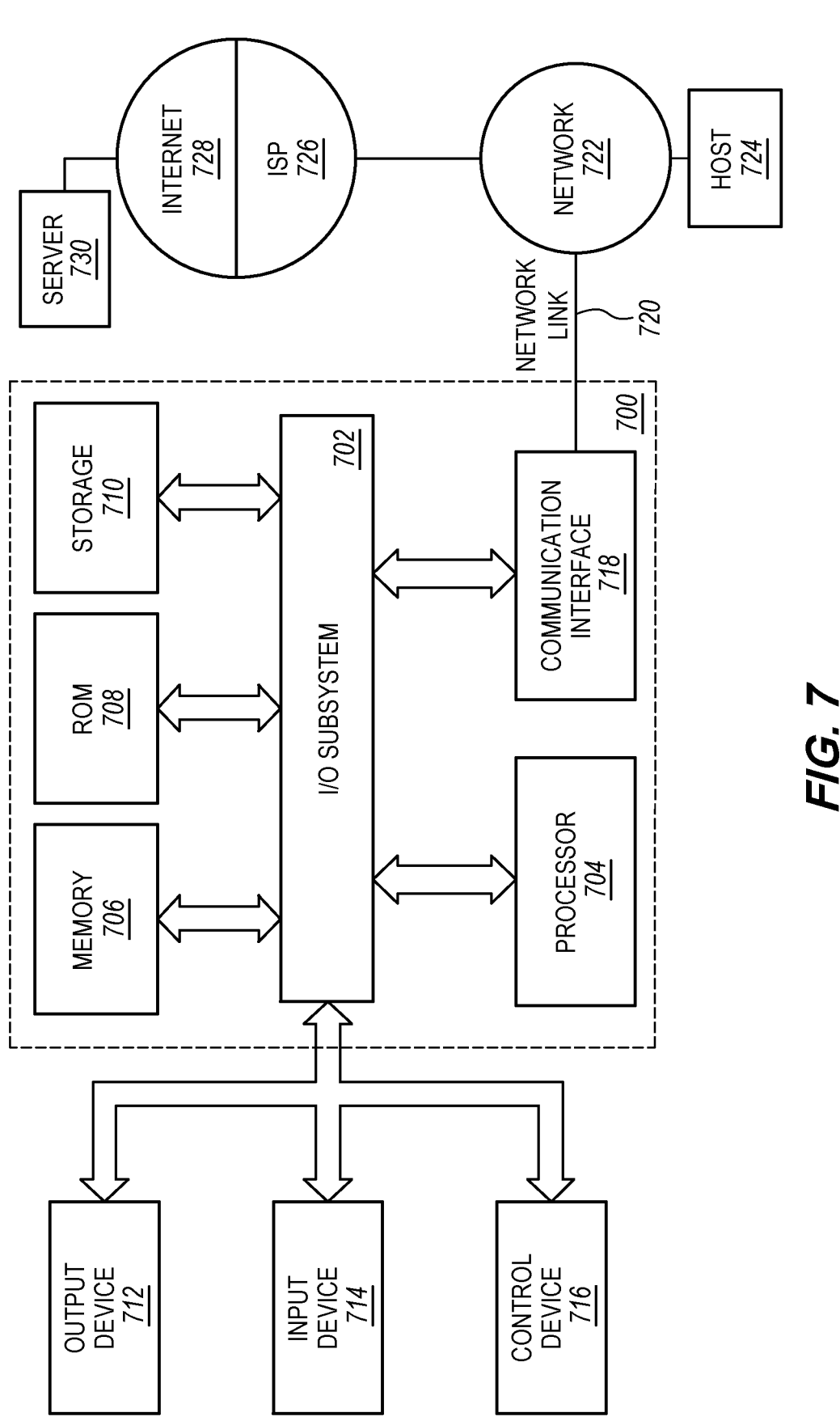
FIG. 7 illustrates a computer system with which one embodiment could be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system, a graphics processing unit (GPU), or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during the execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read-only memory (ROM) 708 or other static storage devices coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touchscreen display, a light-emitting diode (LED) display, a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections, or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on an output device 712 such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an Internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders, and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware, and interfaces for generating position reporting packets, notifications, pulse or heartbeat signals, or other recurring data transmissions that specify a position of the computer system 700, alone or in combination with other application-specific data, directed toward host computer 724 or server computer 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise a bus of I/O subsystem 702. Transmission media can also take the form of acoustic or light waves, such as those generated during radio-wave and infrared data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to I/O subsystem 702. Communication interface 718 provides a two-way data communication coupling to network link(s) 720 that are directly or indirectly connected to at least one communication network, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 722 broadly represents a local area network (LAN), wide-area network (WAN), campus network, internetwork, or any combination thereof. Communication interface 718 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic, or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a worldwide packet data communication network represented as internet 728. A server computer 730 may be coupled to internet 728. Server computer 730 broadly represents any computer, data center, virtual machine or virtual computing instance with or without a hypervisor, or computer executing a containerized program system such as DOCKER or KUBERNETES. Server computer 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server computer 730 may form elements of a distributed computing system that includes other computers, a processing cluster, a server farm, or other organization of computers that cooperate to perform tasks or execute applications or services. Server computer 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 730 may comprise a web application server that hosts a presentation layer, application layer, and data storage layer such as a relational database system using structured query language (SQL) or no SQL, an object store, a graph database, a flat file system, or other data storage.

Computer system 700 can send messages and receive data and instructions, including program code, through the network(s), network link 720, and communication interface 718. In the Internet example, server computer 730 might transmit a requested code for an application program through Internet 728, ISP 726, local network 722, and communication interface 718. The received code may be executed by processor 704 as it is received, and/or stored in storage 710, or other non-volatile storage for later execution.

The execution of instructions as described in this section may implement a process in the form of an instance of a computer program that is being executed and includes program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the present disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method, comprising:

receiving, by a server computer executing a supply chain network analysis application of a supply chain model, supply chain network data associated with a supply chain network having one or more supply chain nodes;

programmatically executing inferences on the supply chain network data, by the server computer, using one or more XGBoost path-level machine learning models and one or more heuristic algorithms to implement descriptive analytics, diagnostic analytics, and prescriptive analytics to create and store one or more scenario prescriptions that specify one or more changes to the one or more supply chain nodes, wherein programmatically executing inferences on the supply chain network data comprises:

extracting one or more data features at a path level, the one or more data features indicating descriptive insights related to one or more paths in the supply chain network;

identifying, using the one or more XGBoost path-level machine learning models, and via FastTreeShap, one or more cost drivers of the one or more paths in the supply chain network by computing a feature score of each of the one or more data features at the path level;

creating and storing, using the one or more path-level machine learning models and the feature score of each of the one or more data features, one or more digital representations of the one or more scenario prescriptions; and executing scenario validation via transmitting a plurality of API calls to one or more networked servers to confirm that nodes exist, that routes exist, and that locations are valid and transmitting one or more database queries to verify that a total time for transiting a scenario is compatible with user or enterprise requirements for transit times;

generating and displaying one or more visualizations of one or more updated network models that implements the one or more scenario prescriptions; and communicating updated configuration data to the one or more supply chain nodes.

2. The computer-implemented method of claim 1, wherein:

the supply chain network data comprises one or more of supply chain data, supply chain configuration data, or model outputs.

3. The computer-implemented method of claim 1, wherein the supply chain network data comprises supply chain data received from a supply chain data source of the one or more supply chain nodes.

4. The computer-implemented method of claim 1, wherein the one or more scenario prescriptions specify node skipping, mode switching, or volume consolidation of shipments.

5. The computer-implemented method of claim 1, wherein the one or more changes to the one or more supply chain nodes comprises one or more of adding or removing a manufacturing (MFG) unit, adding or removing a distribution center (DC) unit, adding or removing a customer location, adding or removing one or more modes of transportation, adding or removing one or more lanes of transportation, consolidating a capacity of one or more products, changing the capacity of the one or more products, or changing a frequency of a shipment.

6. The computer-implemented method of claim 1, further comprising extracting one or more data features at a site level or at a lane level, wherein the one or more data features at the site level or the lane level comprise one or more distance-based features, one or more time-based features, one or more binary features, one or more structured-based features, or one or more flow-based features associated with any of the site level.

7. The computer-implemented method of claim 4, wherein one or more cost-savings functions are calculated based on one or more of a mode distance threshold for a mode selection, a cost threshold on a lane, a geographic distance from a source site to a destination site, or a flow quantity of a product.

8. The computer-implemented method of claim 4, wherein one or more cost-saving functions comprises the volume consolidation of shipments, which comprises:

identifying a path segment of the one or more paths that is shared by one or more other paths of a same product.

9. The method of claim 1, further comprising instructions which, when executed, cause one or more processors to execute communicating the updated configuration data to the supply chain nodes via one or more programmatic calls, push notifications, POST calls, or database SELECT queries to update a database table at the supply chain nodes.

10. The method of claim 1, wherein the supply chain data comprising quantities of paths in the range of 50,000 to 4 million paths; further comprising instructions which, when executed cause one or more processors to execute, after receiving the supply chain network data, querying a third-party global airport/port database to determine whether both a source node and destination node for a particular path may use ocean or air transportation.

11. One or more non-transitory computer-readable storage media, storing instructions which when executed cause one or more processors to execute:

receiving, by a server computer executing a supply chain network analysis application of a supply chain model, supply chain network data associated with a supply chain network having one or more supply chain nodes;

programmatically executing inferences on the supply chain network data, by the server computer, using one or more XGBoost path-level machine learning models and one or more heuristic algorithms to implement descriptive analytics, diagnostic analytics, and prescriptive analytics to create and store one or more scenario prescriptions that specify one or more changes to the one or more supply chain nodes, wherein programmatically executing inferences on the supply chain network data comprises:

extracting one or more data features at a path level, the one or more data features indicating descriptive insights related to one or more paths in the supply chain network;

identifying, using the one or more XGBoost path-level machine learning models, and via FastTreeShap, one or more cost drivers of the one or more paths in the supply chain network by computing a feature score of each of the one or more data features at the path level;

creating and storing, using the one or more path-level machine learning models and the feature score of each of the one or more data features, one or more digital representations of the one or more scenario prescriptions; and executing scenario validation via transmitting a plurality of API calls to one or more networked servers to confirm that nodes exist, that routes exist, and that locations are valid and transmitting one or more database queries to verify that a total time for transiting a scenario is compatible with user or enterprise requirements for transit times;

generating and displaying one or more visualizations of one or more updated network models that implements the one or more scenario prescriptions; and communicating updated configuration data to the one or more supply chain nodes.

12. The one or more non-transitory computer-readable storage media of claim 11, storing instructions which when executed cause the one or more processors to execute:

determining one or more cost-saving functions for the one or more scenario prescriptions, wherein the one or more cost-saving functions comprises node skipping, mode switching, or volume consolidation of shipments.

13. The one or more non-transitory computer-readable storage media of claim 11, wherein the one or more changes to the one or more supply chain nodes comprises one or more of adding or removing a manufacturing (MFG) unit, adding or removing a distribution center (DC) unit, adding or removing a customer location, adding or removing one or more modes of transportation, adding or removing one or more lanes of transportation, consolidating a capacity of one or more products, changing the capacity of the one or more products, or changing a frequency of a shipment.

14. The one or more non-transitory computer-readable storage media of claim 11, storing instructions which when executed cause the one or more processors to execute extracting one or more data features at a site level or at a lane level, wherein the one or more data features at the site level or the lane level comprise one or more distance-based features, one or more time-based features, one or more binary features, one or more structured-based features, or one or more flow-based features associated with any of the site level.

15. The one or more non-transitory computer-readable storage media of claim 11, further comprising instructions which, when executed cause the one or more processors to execute communicating the updated configuration data to the supply chain nodes via one or more programmatic calls, push notifications, POST calls, or database SELECT queries to update a database table at the supply chain nodes.

16. The one or more non-transitory computer-readable storage media of claim 11, wherein the supply chain data comprising quantities of paths in the range of 50,000 to 4 million paths; further comprising instructions which, when executed cause the one or more processors to execute, after receiving the supply chain network data, querying a third-party global airport/port database to determine whether both a source node and destination node for a particular path may use ocean or air transportation.

\* \* \* \* \*